(12) United States Patent
Gadre et al.

(10) Patent No.: US 8,997,103 B2
(45) Date of Patent: Mar. 31, 2015

(54) N-WAY MEMORY BARRIER OPERATION COALESCING

(75) Inventors: Shirish Gadre, Fremont, CA (US);
Charles McCarver, Madison, AL (US);
Anjana Rajendran, San Jose, CA (US);
Omkar Paranjape, Austin, TX (US);
Steven James Heinrich, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 351 days.

(21) Appl. No.: 13/441,785

(22) Filed: Apr. 6, 2012

(65) Prior Publication Data

US 2012/0198214 A1 Aug. 2, 2012

Related U.S. Application Data

(63) Continuation-in-part of application No. 12/887,081, filed on Sep. 21, 2010.

(60) Provisional application No. 61/246,047, filed on Sep. 25, 2009.

(51) Int. Cl.
*G06F 9/46* (2006.01)
*G06F 1/04* (2006.01)
*G06F 7/00* (2006.01)
*G06F 9/38* (2006.01)
*G06F 9/30* (2006.01)
*G06F 9/52* (2006.01)

(52) U.S. Cl.
CPC ............ *G06F 9/3834* (2013.01); *G06F 9/3004* (2013.01); *G06F 9/30087* (2013.01); *G06F 9/3851* (2013.01); *G06F 9/522* (2013.01)
USPC ............ 718/103; 718/106; 713/375; 707/610

(58) Field of Classification Search
None
See application file for complete search history.

(56) References Cited

U.S. PATENT DOCUMENTS 7,725,618 B2 * 5/2010 Day et al. ........................ 710/22
2011/0078692 A1 * 3/2011 Nickolls et al. ............... 718/103

* cited by examiner

*Primary Examiner* — Mengyao Zhe
(74) *Attorney, Agent, or Firm* — Artegis Law Group, LLP

(57) ABSTRACT

One embodiment sets forth a technique for N-way memory barrier operation coalescing. When a first memory barrier is received for a first thread group execution of subsequent memory operations for the first thread group are suspended until the first memory barrier is executed. Subsequent memory barriers for different thread groups may be coalesced with the first memory barrier to produce a coalesced memory barrier that represents memory barrier operations for multiple thread groups. When the coalesced memory barrier is being processed, execution of subsequent memory operations for the different thread groups is also suspended. However, memory operations for other thread groups that are not affected by the coalesced memory barrier may be executed.

18 Claims, 15 Drawing Sheets

N-WAY MEMORY BARRIER OPERATION COALESCING

CROSS-REFERENCE TO RELATED APPLICATIONS

This application is a continuation in part of U.S. patent application titled, "COALESCING MEMORY BARRIER OPERATIONS ACROSS MULTIPLE PARALLEL THREADS," filed on Sep. 21, 2010 and having Ser. No. 12/887,081 and claiming priority benefit to U.S. provisional patent application titled, "PARALLEL, COALESCING MEMORY BARRIER IMPLEMENTATION," filed on Sep. 25, 2009 and having Ser. No. 61/246,047. These related patent applications are hereby incorporated herein by reference in their entirety.

BACKGROUND OF THE INVENTION

1. Field of the Invention

Embodiments of the invention relate generally to multi-threaded program execution, and more specifically to N-way memory barrier operation coalescing.

2. Description of the Related Art

Conventional parallel processing architectures support execution of multiple threads. A memory transaction is considered "performed" when it has been committed to memory order and is visible to any thread, processing unit, or device that may access the memory, e.g. a store or write operation has been "committed" to memory and subsequent load or read operations will see the stored data. Memory barrier instructions (or fence instructions) are used to order the execution of memory transactions. From the standpoint of one thread, processing unit, or device, when it executes a memory barrier instruction, it waits until all its prior memory transactions have committed to memory before executing any subsequent memory transactions. Within that thread, memory transactions that occur after the memory barrier instruction, in program order, are delayed until all of the threads' memory transactions that occur prior to the memory barrier instruction in program order are committed to memory. The results of committed memory transactions may be visible to other threads, and the memory barrier instruction delays the requesting thread until all its prior memory transactions are visible to other threads. After waiting for a memory barrier, the requesting thread may then synchronize or communicate with other threads knowing that they can access the results of its prior memory transactions. Parallel processors that support large numbers of parallel threads that cooperate or communicate, such as multi-threaded processors that execute thousands of parallel threads, need to frequently execute memory barrier instructions to ensure proper ordering and visibility of memory transactions. A conventional memory barrier instruction waits until the request travels to the system memory commit point where results are visible to all threads, processing units, and devices in the system, and then waits until an acknowledgement returns to the requesting thread. Round-trip latency to the system memory commit point can be very long, e.g. hundreds of cycles. Therefore, execution of memory barrier instructions can reduce the instruction processing throughput of a conventional parallel processing architecture since the multiple requesting threads are idle during execution of a long-latency memory barrier (waiting for memory transactions to be committed to memory and for results to become visible to all other threads).

More recently, parallel processing architectures allow for sets of parallel threads to execute cooperatively together at different thread grouping levels. For example, a set of parallel threads comprising a cooperative thread array (CTA) can execute together within a multi-threaded processor. Multiple CTAs can execute concurrently and cooperate within a processor or among several processors, and also cooperate with other threads, processors, and devices in large systems. A CTA program may need to order memory transactions among the set of threads comprising the CTA, or among the threads executing in the same processor, or among different CTAs in different processors, or among the threads, processors, and devices of the whole system. Therefore, execution of memory barrier instructions can further reduce the instruction processing throughput of a parallel processing architecture when threads are cooperating and interacting at multiple levels of cooperation across a parallel system having many parallel threads and processors.

Accordingly, what is needed in the art is an improved technique for performing a memory barrier operation across multiple parallel threads that are cooperating at multiple levels in a parallel system.

SUMMARY OF THE INVENTION

A system and method performs N-way memory barrier operation coalescing. Given the scalable nature of a multi-threaded parallel processing architecture, the total number of threads on a given processing unit, and the total number of memory transactions that may be simultaneously in flight across an entire system, memory barrier operations can be costly to perform. As such, memory barrier requests from multiple threads or processing units are coalesced to reduce the impact to the rest of the system. Multiple memory barrier operations may be in-flight during execution of multiple thread groups, where each thread group includes a set of parallel threads.

Various embodiments of a method of the invention for processing memory barrier instructions include receiving a first memory barrier instruction for a first thread group that includes multiple parallel execution threads and blocking the execution of memory transactions for the first thread group that are subsequent to the first memory barrier instruction in program order. Subsequent to the first memory barrier instruction, a first set of memory transactions for at least a second thread group is received and a tagged memory command stream that includes the first set of memory transactions followed by the first memory barrier instruction is constructed, where a first coalescing index is associated with the first memory barrier instruction and each one of the memory transactions of the first set of memory transactions. The tagged memory command stream is transmitted to a memory management unit to process the first set of memory transactions and the first memory barrier instruction. After determining that all memory transactions that occur prior to the first memory barrier instruction in the tagged memory command stream are committed to memory the first memory barrier is released to allow the memory transactions for the first thread group that are subsequent to the first memory barrier instruction in program order to be executed.

Various embodiments of the invention include a processing subsystem for processing memory barrier instructions. The processing subsystem includes an instruction scheduling unit that is configured to issue for execution a first memory barrier instruction for a first thread group that includes multiple parallel execution threads. Subsequent to the first memory barrier instruction, the instruction scheduling unit issues for execution a first set of memory transactions for at least a second thread group. The instruction scheduling unit blocks the execution of memory transactions for the first thread group that are subsequent to the first memory barrier instruction in program order and releases the first memory barrier to allow execution of the memory transactions for the first thread group that are subsequent to the first memory barrier instruction in program order when an acknowledgement signal is received. The processing subsystem also includes a memory management unit that is configured to process memory transactions and memory barrier instructions and a memory barrier instruction execution unit. The memory barrier instruction execution unit is configured to receive the first memory barrier instruction, receive the first set of memory transactions, and construct a tagged memory command stream that includes the first set of memory transactions followed by the first memory barrier instruction, where a first coalescing index is associated with the first memory barrier instruction and each one of the memory transactions of the first set of memory transactions.

One advantage of the disclosed system and method is that when a first memory barrier is received for a first thread group execution of subsequent memory operations for the first thread group are held until the first memory barrier is executed. Subsequent memory barriers for different thread groups may be coalesced with the first memory barrier to produce a coalesced memory barrier that represents memory barriers for multiple thread groups. When the coalesced memory barrier is being processed, execution of subsequent memory operations for the first thread group and the different thread groups is suspended. However, memory operations for other thread groups that are not affected by the coalesced memory barrier may be executed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
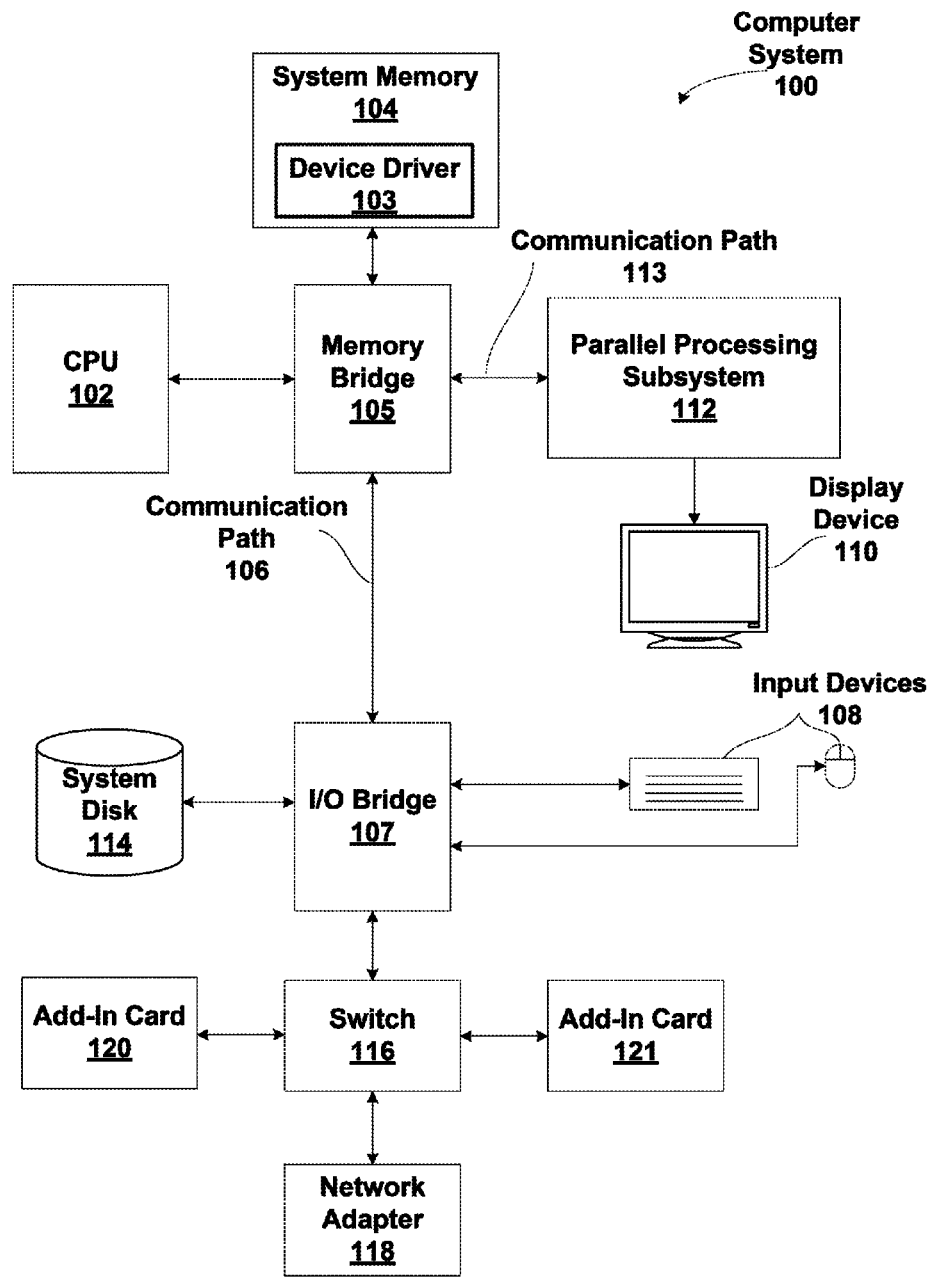
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
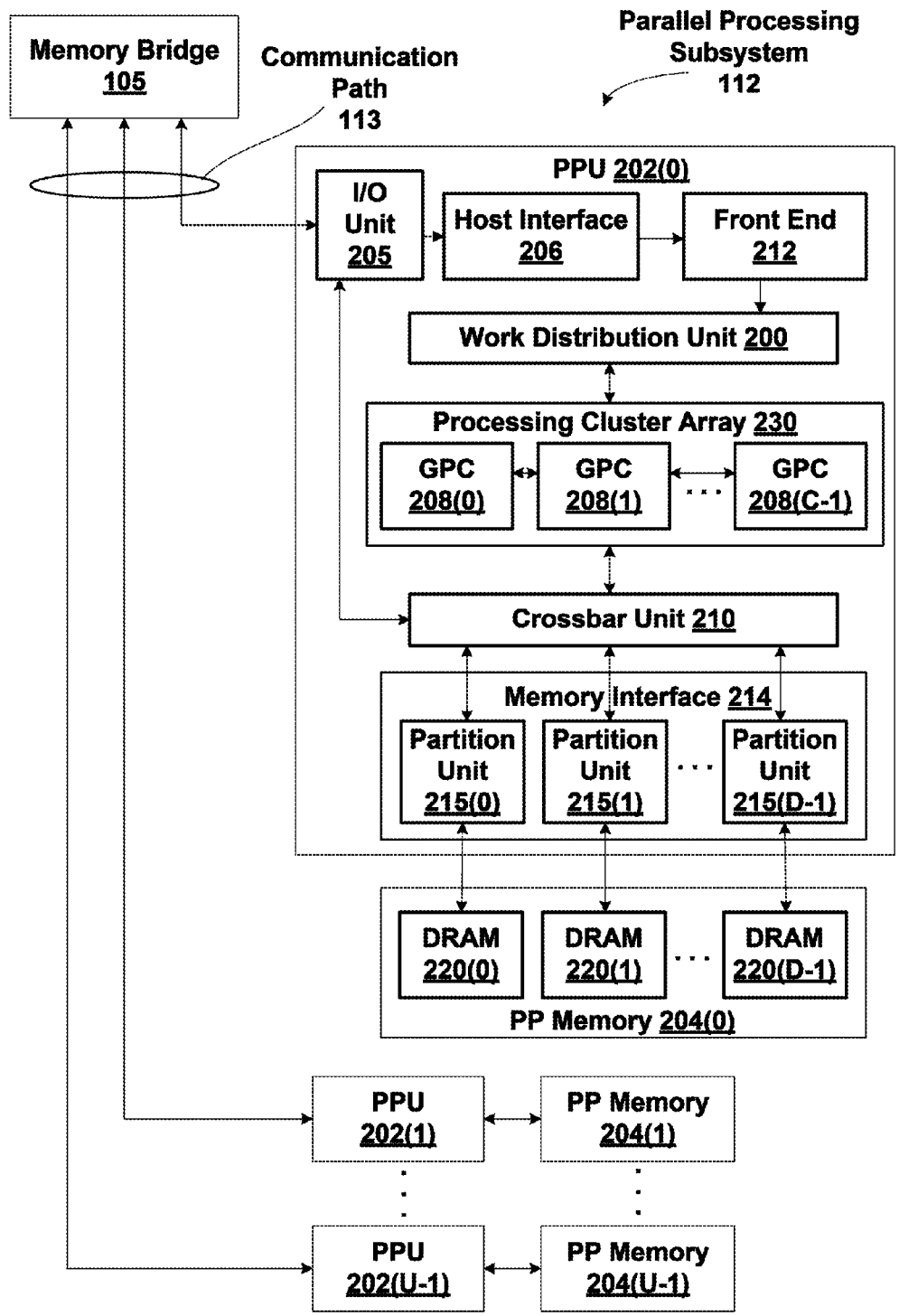
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
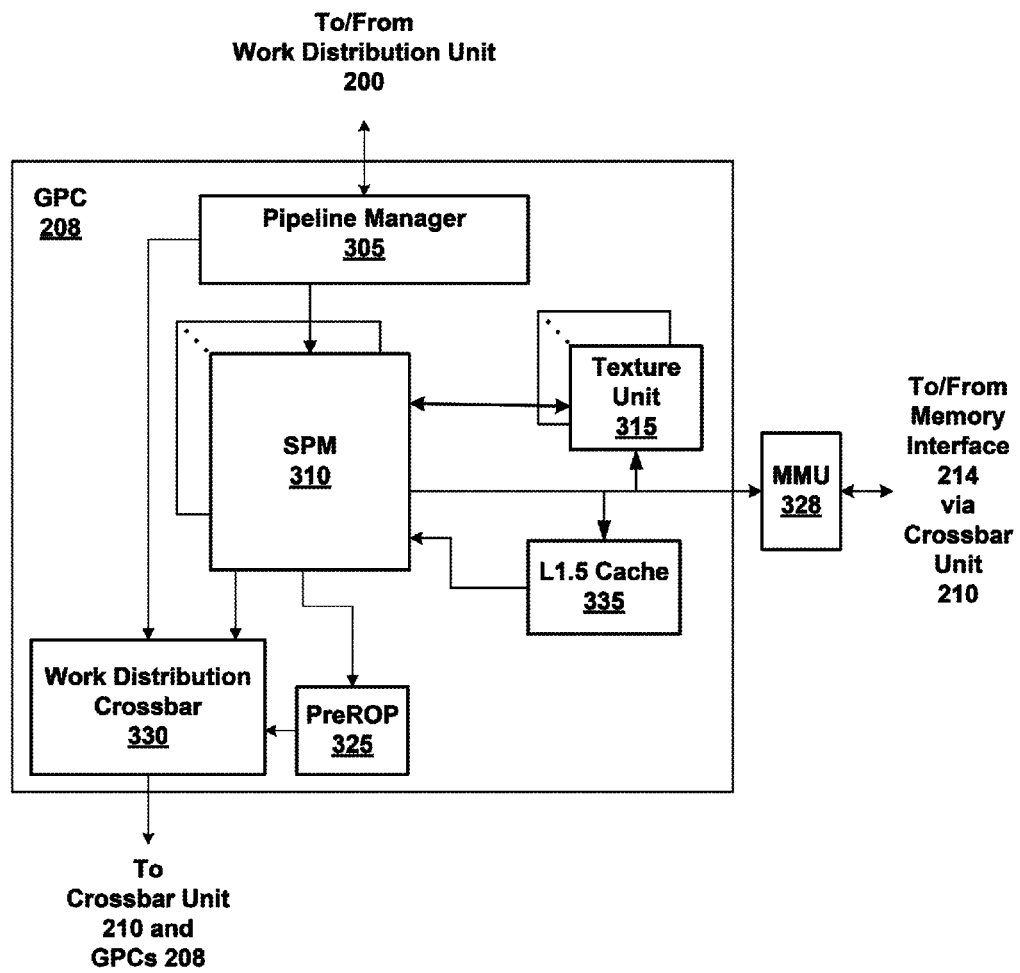
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing instructions on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to multithreaded SIMT processors called streaming multiprocessors (SPMs) 310 or simply parallel thread processors. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

As previously defined herein, a thread is an instance of a particular program executing instructions on a particular set of input data. The collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (320 in FIG. 3C) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
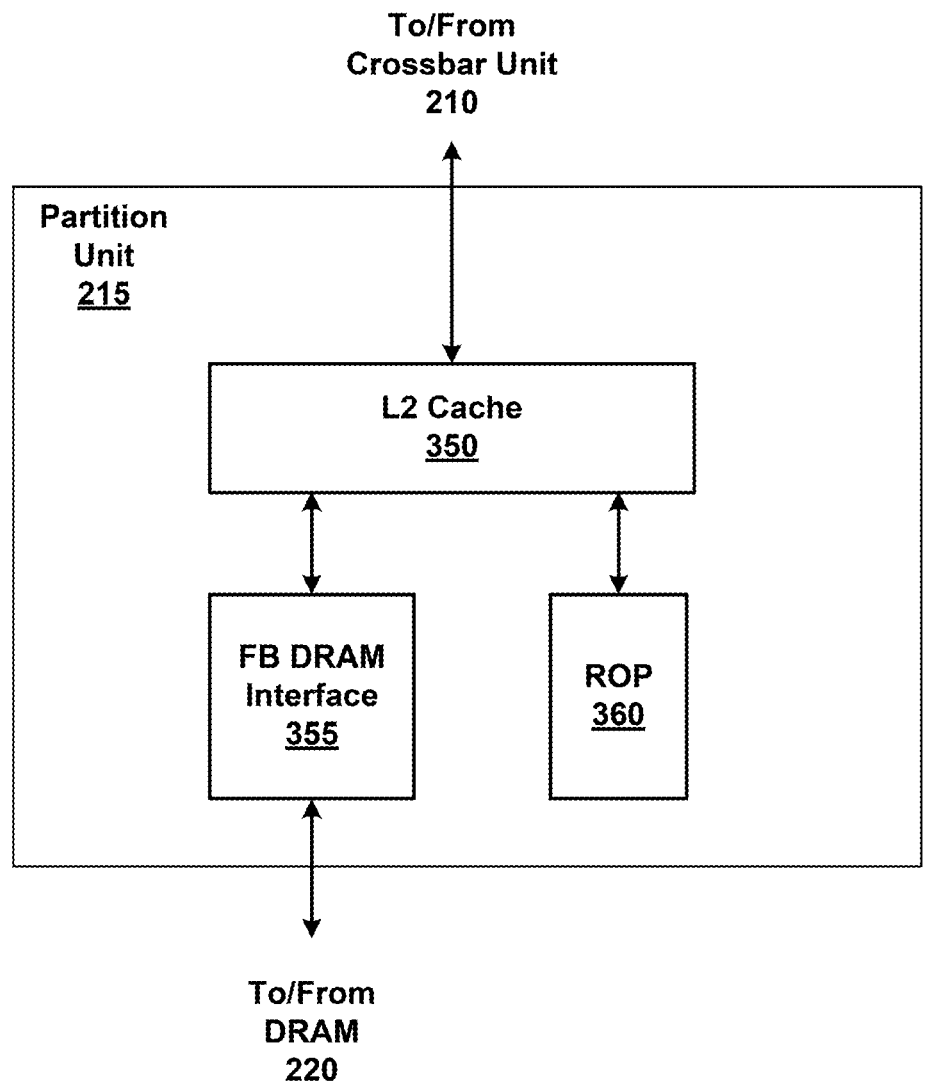
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
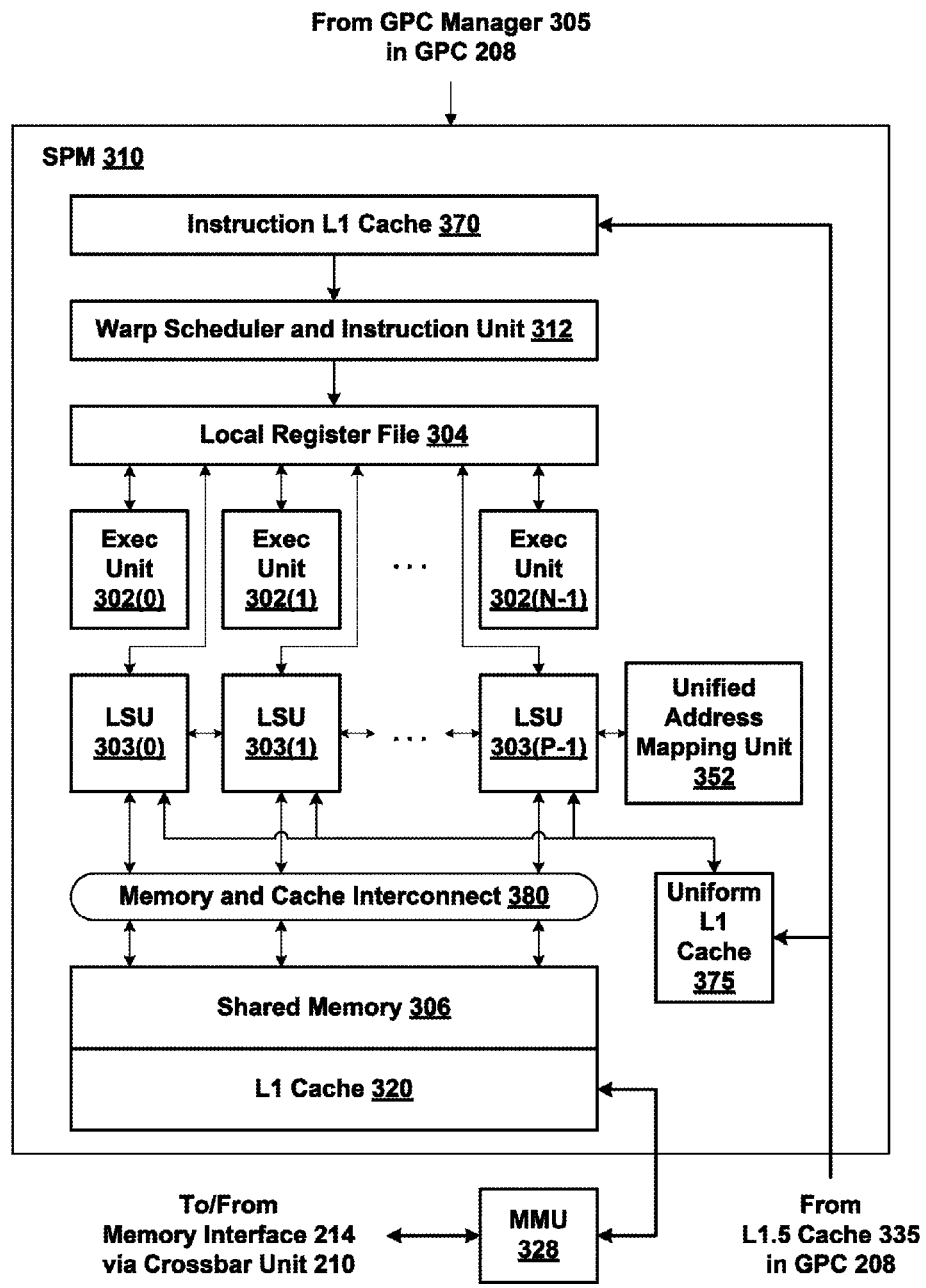
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMT or SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335. In one embodiment the L1 cache 320 is included within the LSUs 303.

Coalescing Memory Barrier Operations

The computing system 100 provides a many-core high performance compute platform for academic research, commercial, and consumer applications across a broad range of problem spaces. Among key components of the architecture are the memory hierarchy that supports accesses to parallel processing memory (DRAM) and system memory and the SPM 310 that supports the simultaneous scheduling and execution of multiple threads in a CTA. In one embodiment, up to 1024 threads are included in a CTA, where 32 threads are collected into an execution unit called a warp, as previously defined herein. All active threads within the warp execute the same instruction but with independent address, data, register, and control state. Memory operations must be managed carefully in this SIMT environment to ensure correct program behavior.

A relaxed memory ordering model is used that allows flexibility in how memory operations are issued, accepted, and ordered throughout the system. More specifically, memory operations can be performed in any order except with respect to LOAD and STORE operations from the same thread to the same memory address. LOAD and STORE operations from any one thread to the same memory address must be performed with respect to just that thread in program order of those LOAD and STORE operations. This flexibility allows for increased performance in general, but correct program execution may require certain points in memory transactions around which sequential order is guaranteed. In these cases, a memory barrier (MEMBAR) instruction is used to ensure that all memory transactions issued before the MEMBAR instruction are sufficiently performed so that their results are visible to any memory transactions issued after the MEMBAR instruction.

From the standpoint of a single thread running alone, memory operations to a given address must appear to be performed in program order. This matches normal C program semantics, and is necessary for the CUDA programming model. Once multiple threads are involved, memory ordering becomes more complex, and must be defined in terms of when a memory transaction is "performed", and thus visible to other threads and memory clients.

A memory transaction, such as a load or store operation is defined as being performed based on the following definition, "A request is initiated when a processor has sent the request and the completion of the request is out of its control. An initiated request is issued when it has left the processor environment and is in transit in the memory system. A LOAD by processor I is considered performed with respect to processor K at a point in time when the issuing of a STORE to the same address by processor K cannot affect the value returned to processor I. A STORE by processor I is considered performed with respect to processor K, at a point in time when an issued LOAD to the same address by processor K returns the value defined by the STORE. An access by processor I is performed when it is performed with respect to all processors." (see Dubois, M., Scheurich, C., & Briggs, F. (1986). Memory access buffering in multiprocessors. In Proceedings of the 13th annual International Symposium on Computer Architecture (pp. 434-442). ACM)

The programming model used by the computer system 100 recognizes three levels of affinity for memory clients: threads in the same CTA ("CTA" level), threads and other clients in the same PPU 202 ("global" level), and all threads and clients with access to the same memory in the computer system 100, including the host CPU 102 and peer PPUs 202 ("system" level). Other embodiments may support other affinity levels for MEMBAR instructions, including a thread (self) affinity level, and a warp affinity level (the set of threads that execute a SIMT or SIMD instruction together). In the context of the computer system 100, a memory transaction is considered "performed" when it has been committed to memory order and is visible to all other threads and clients at the indicated level of affinity. For example, a load (LD) by a first thread in a CTA is considered "performed" at the CTA level with respect to other threads in a CTA at a point in time when the issuing of a store (ST) to the same address by one of the other threads in the CTA cannot affect the value returned to the first thread. In another example, a store (ST) by the first thread in a CTA is considered "performed" at the CTA level at a point in time when an issued LD to the same address by another thread in the CTA returns the value defined by the STORE; threads that are not in the same CTA may or may not see the result of the store by the first thread. In general, it is faster and less expensive to perform memory operations at the lower affinity levels of visibility. In one embodiment, the CTA affinity level is the lowest level is the lowest affinity level and the system affinity level is the highest affinity level. In other embodiments, the thread or warp affinity level is the lowest level.

In this discussion, the term "load" is used to describe a class of instructions that read and return a value from memory, while "store" describes instructions that write a value to memory. Some instructions, such as atomic and locking operations, read and modify memory and return values, and thus should be considered to have both load and store semantics, and thus follow both load and store ordering rules.

There are many definitions and ordering rules for the overall memory consistency model. Memory ordering rules specific to MEMBAR operations are defined in terms of two orders: program order and dependence order. Program order requires that memory operations are performed in the exact sequential order as the instructions are in the program. Dependence order is a partial ordering that describes the constraints that hold between instructions in a thread that access the same register or memory location. This covers data dependencies, such as values passed through scoreboarded resources such as the register file, condition code register, or predicate registers; and also includes control dependencies, such as a store following a conditional branch.

Within the relaxed memory ordering rules, MEMBAR instructions order the performance of memory transactions within a given thread or warp. Memory transactions that occur prior to the MEMBAR instruction in program order will be performed in memory prior to any memory transactions that occur after the MEMBAR instruction in program order.

The relaxed memory ordering rules have implications for memory transactions. For example, if one thread stores to two different addresses, another thread could see those stores in any order. To enforce an inter-thread or inter-address order on memory transactions, the program must execute a MEMBAR instruction. MEMBAR effectively inserts a fence in the stream of memory operations, such that operations executed by this thread prior to the MEMBAR are guaranteed to be performed before memory operations executed after the MEMBAR. It is also the responsibility of the reading thread to execute a MEMBAR between load operations that it expects to be performed in a specific order, unless this order is established via other ordering rules such as dependency.

There are multiple levels of MEMBAR instructions that differ in the scope of other threads that are affected. MEMBAR.CTA enforces memory ordering among threads in the CTA, MEMBAR.GL enforces ordering at the global level (e.g. among the memory interface 214 clients), and MEMBAR.SYS enforces ordering at the system level (e.g. including system and peer memory). The MEMBAR.CTA ensures that all prior memory transactions are committed at a CTA level such that they are visible to all threads in the same CTA, such as the L1 cache 320 level. The MEMBAR.GL ensures that all prior memory transactions are committed at a global level such that that they are visible to all threads in the same PPU, such as the L2.cache 350 level. The MEMBAR.SYS ensures that all prior memory transactions are committed at a system level such that they are visible to all threads and clients in the system.

These three levels form a hierarchy, and a MEMBAR at any level implies ordering at the lower levels. Thus, MEMBAR.GL effectively implies a MEMBAR.CTA, and a MEMBAR.SYS implies MEMBAR.GL. Note that these orderings are defined in terms of threads, and not in terms of memory spaces (e.g., local, shared, and global memory, where global memory includes the DRAM 220 and system memory 104). Specifically, threads within a CTA can communicate through global memory using MEMBAR.CTA to order their transactions, which is typically lower latency than using MEMBAR.GL. Other embodiments may include additional affinity levels, including MEMBAR.THREAD for ordering transactions within a thread without regard to other threads, and MEMBAR.WARP for ordering transactions among the threads comprising a warp.

The following memory barrier instruction implements the concepts described above:

MEMBAR.lvl
.lvl: {.CTA, .GL, .SYS} CTA, Global, System level
MEMBAR Levels:
.CTA CTA thread level
  Waits until all prior memory writes are visible to other threads in the same CTA.
  Waits until prior memory reads have been performed with respect to other threads in the CTA.
  For communication within a CTA, MEMBAR.CTA is the appropriate type of MEMBAR.
.GL Global level
  Waits until all prior memory requests have been performed with respect to all other threads in the PPU.
  For communication between threads in different CTAs, MEMBAR.GL is the appropriate type of MEMBAR.
  MEMBAR.GL will typically be more expensive (longer latency) than MEMBAR.CTA
.SYS System level
  Waits until all prior memory requests have been performed with respect to all threads and clients, including the DRAM and those communicating via communication path 113, such as system and peer-to-peer memory.
  This level of MEMBAR is required to insure performance with respect to a host CPU thread or other system level peers that are coupled to the host CPU 102 via the memory bridge 105.
  Writes to system memory pass through the L2 cache to communication path 113.
  MEMBAR.SYS will typically be much more expensive (longer latency) than MEMBAR.GL Given the scalable nature of the PPU 202 architecture, the total number of threads on a given SPM 310, and the total number of memory transactions that may be simultaneously in flight across an entire implementation, an MEMBAR operation can be costly to perform. As such, MEMBAR requests from a given SPM 310 are coalesced to reduce to impact to the rest of the system.

At the lowest level, MEMBAR operations may be partly coalesced due to per-warp grouping of threads. In other words, the threads within a warp will execute a MEMBAR synchronously. The warp scheduler and instruction unit 312 ultimately knows the execution state of all threads within a CTA and in particular within a warp. For a MEMBAR.CTA, the warp scheduler and instruction unit 312 ensures all prior load/store requests or requests which could otherwise affect the state of memory have been accepted for execution (and their order of performance established within the CTA) before allowing subsequent requests. Execution of a MEMBAR.CTA may be accomplished within the SPM 310. The higher levels of MEMBAR.GL and MEMBAR.SYS require architecture-wide checks, and coalescing and ordering is implemented outside of SPM 310.

Figure 4:
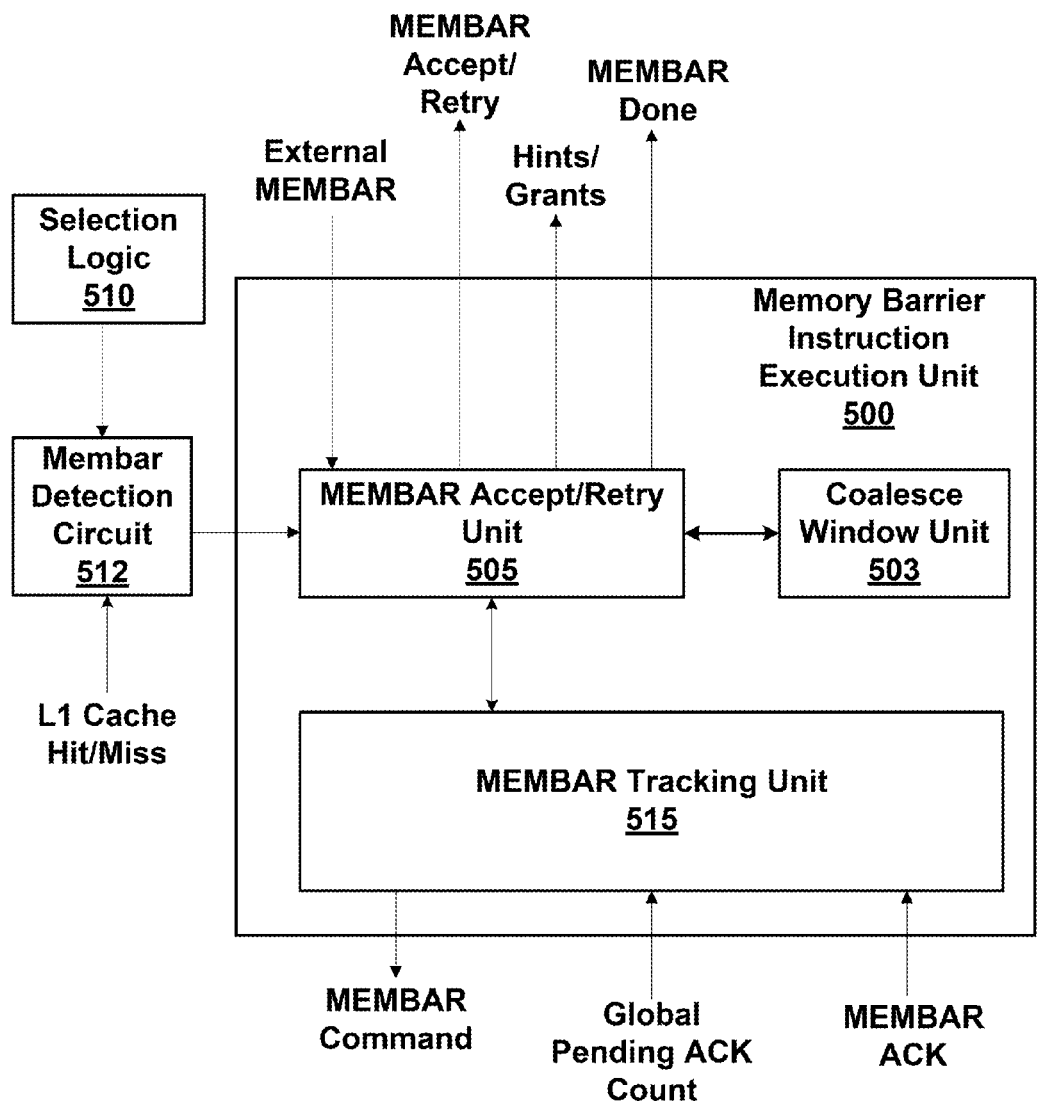
FIG. 4 is a block diagram of a memory barrier instruction execution unit, according to one embodiment of the present invention.

The L1 Cache 320 is a first level data cache responsible for memory requests from SM where much of the coalescing is done. The threads within a CTA may naturally execute MEMBAR.GL or MEMBAR.SYS in a temporally coherent manner. The L1 cache 320 takes advantage of this by coalescing MEMBARs that arrive within a configurable temporal window before sending a single MEMBAR request to the rest of the memory system. The warp scheduler and instruction unit 312 and the L1 cache 320 communicate throughout this process to establish the following:

1) which MEMBARs are accepted for coalescing
2) which MEMBARs missed the coalescing window and must be deferred to be retried in the future
3) which MEMBARs are deferred for reasons other than not being accepted as part of a prior MEMBAR.
4) when all MEMBARs accepted for coalescing are done being executed
5) when any MEMBAR that was deferred can be retried
6) hints from the L1 cache 320 to the warp scheduler and instruction unit 312 to indicate preferred types of memory requests that will increase the coalescing efficiency FIG. 4 is a block diagram of a memory barrier instruction execution unit 500, according to one embodiment of the present invention. In some embodiments the memory barrier instruction execution unit 500 is within each L1 cache 320 to coalesce MEMBAR.CTA, MEMBAR.GL, and MEMBAR.SYS instructions across multiple threads. Another memory barrier instruction execution unit 500 may be included within each L2 cache 350 to coalesce MEMBAR.GL and MEMBAR.SYS instructions across multiple threads and yet another memory barrier instruction execution unit 500 may be included within each I/O unit 205 to coalesce MEMBAR.SYS instructions across multiple threads.

The warp scheduler and instruction unit 312 includes selection logic 510 that selects a next instruction to issue. Selection logic 510 may be of generally conventional design, and a detailed description is omitted as not being critical to understanding the present invention. A MEMBAR detection circuit 512 that is also included in the warp scheduler and instruction unit 312 receives each selected instruction. The selected instruction may be a MEMBAR instruction that specifies a memory barrier level, e.g., CTA, GL, or SYS.

When the selected instruction is a MEMBAR instruction, MEMBAR detection circuit 512 directs the instruction to the memory barrier instruction execution unit 500; otherwise, MEMBAR detection circuit 512 forwards the instruction to the next stage for eventual delivery to execution units 302. In one embodiment, the MEMBAR.CTA is executed by the MEMBAR detection circuit 512 since a memory barrier at the CTA level commits memory transactions at the L1 cache 320.

Memory barrier instruction execution unit 500 includes a MEMBAR accept/retry unit 505, a coalesce window unit 503, and a MEMBAR tracking unit 515. The MEMBAR accept/retry unit 505 receives the MEMBAR instruction and determines if the MEMBAR instruction can be accepted. If not, then the MEMBAR accept/retry unit 505 negates an accept signal and discards the MEMBAR instruction. The MEMBAR accept/retry unit 505 signals via the retry to indicate when a MEMBAR instruction that was not accepted should be retried. When the MEMBAR instruction can be accepted, the MEMBAR accept/retry unit 505 asserts the accept signal. When a coalesce (temporal) window is closed, then the accepted MEMBAR instruction is the first MEMBAR instruction since either a reset or a previous MEMBAR instruction was executed, and the coalesce window is opened by the coalesce window unit 503. Subsequent MEMBAR instructions are accepted while the coalesce window remains open.

The duration of the coalescing window is configurable from 0 clocks (disabled) to on the order 1000's of clocks. This allows tuning in the amount of target MEMBAR instructions from typical CTAs to coalesce given the cost for the rest of the system to implement the .SYS or .GL MEMBAR once it leaves the L1 cache 320. When the coalesce window closes, a transition window opens, as described in greater detail in conjunction with FIGS. 5A and 5B. The duration of the transition window is not configurable, since it is governed by communication latencies between the L1 cache 320 and the warp scheduler and instruction unit 312.

When the coalesced MEMBAR instruction can be issued by the memory barrier instruction execution unit 500, the MEMBAR tracking unit 515 outputs the MEMBAR command to the MMU 328. Note that MEMBAR.CTA instructions (coalesced or not) are not output to the MMU 328 since execution of a MEMBAR.CTA instruction is completed for the threads within a SPM 310 when the memory transactions before the MEMBAR.CTA are committed to the L1 cache 320.

The MEMBAR tracking unit 515 receives a MEMBAR ACK (acknowledgement) signal from the MMU 328 when each coalesced MEMBAR.GL and MEMBAR.SYS is completed. The MEMBAR.GL instructions are completed when all of the memory transactions before the MEMBAR .GL are committed to the L2 cache 350. The MEMBAR.SYS instructions are completed when all of the memory transactions before the MEMBAR.SYS are committed to system memory 104 which is typically considered to be when the memory transactions are output by the parallel processing subsystem 112 to the communication path 113.

Figure 5A:
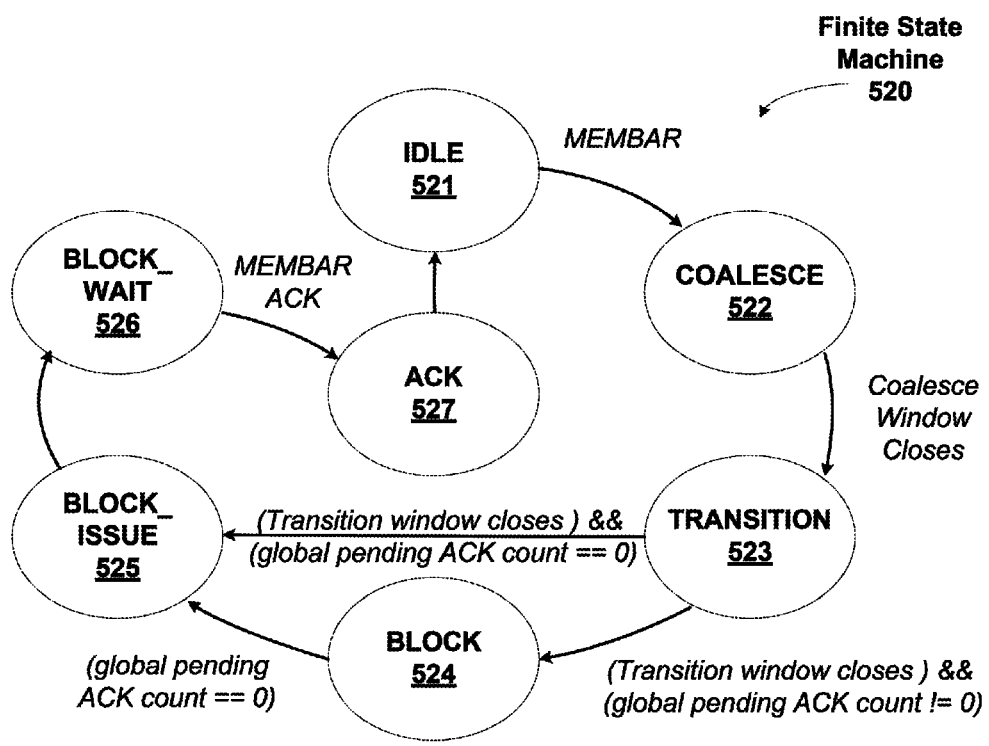
FIG. 5A is a block diagram of finite state machine, according to one embodiment of the present invention.
Figure 5B:
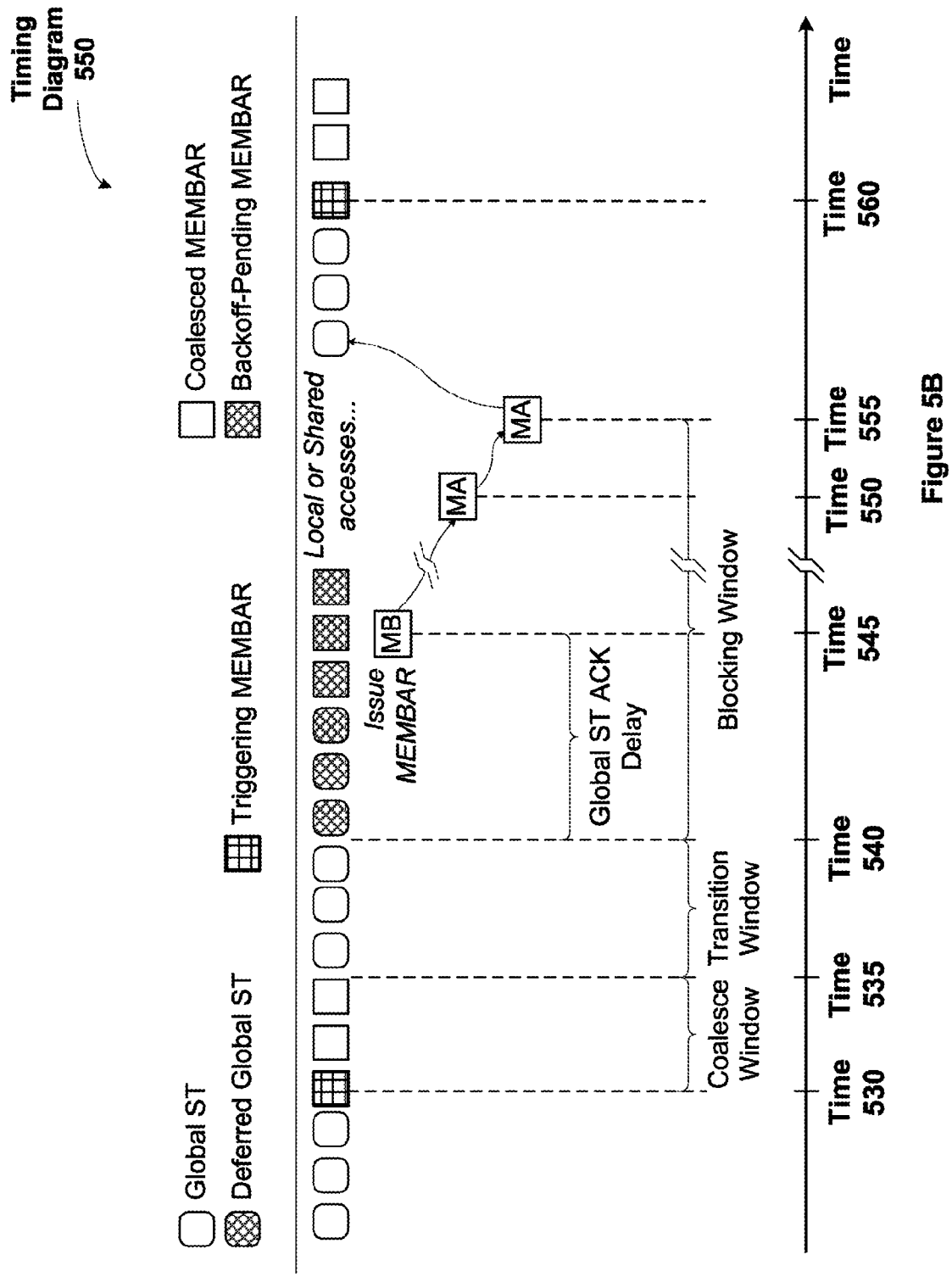
FIG. 5B is a conceptual diagram illustrating the coalescing of memory barrier instructions, according to one embodiment of the present invention.

The global pending ACK count is used by the MEMBAR tracking unit 515 to determine when the coalesced MEMBAR command can be output and is described in further detail in conjunction with FIGS. 5A and 5B. When the MEMBAR ACK is received by the MEMBAR tracking unit 515, the MEMBAR accept/retry unit 505 outputs the MEMBAR done to the warp scheduler and instruction unit 312 and execution of the MEMBAR instruction is complete. Execution of any threads that were blocked waiting for a MEMBAR instruction to be done that is included in the coalesced MEMBAR instruction resumes.

The MEMBAR accept/retry unit 505 also receives an external MEMBAR request signal that is output by the work distribution unit 200. An external MEMBAR request is used to enforce ordering between separately issued but dependent grids that are composed of multiple CTAs and distributed across the processing cluster array 230 for processing. As such, multiple grids can be in flight at any one time, but only if there are no dependencies among them. Before a grid Gn that depends on results from a grid Gk can begin, (1) all CTAs launched from Gk needs to be complete, and (2) all memory operations from Gk must be committed. However, multiple grids which do not depend on Gk but otherwise meet their respective dependency criteria, if any, may be launched while Gk is still running.

To implement condition (2) above once condition (1) is established, the L1 cache 320 receives a request in the form of a memory flush bundle for a MEMBAR.GL or MEMBAR.SYS operation. The memory flush bundle is provided external to the instruction stream and is shown as the external MEMBAR signal input to the MEMBAR accept/retry unit 505. The external MEMBAR ensures all memory operations of a grid are committed, even though each CTA may not have issued a MEMBAR instruction via the warp scheduler and instruction unit 312 within the SPM 310. The work distribution unit 200 can issue requests (bundles) to the L1 cache 320 asynchronous to current requests received by the SPM 310, so the external MEMBAR may be coalesced with any MEMBAR instructions issued by currently active and non-dependent grids. The external MEMBAR instruction can also be used for graphics work to similarly ensure results from running shaders on the SPM 310 (e.g., vertex shaders, geometry shaders, pixel shaders, . . . ) will be visible, either within the PPU 202 or if accessed by the CPU 102.

In one embodiment, only one coalesced and pending MEMBAR instruction is supported. In another embodiment, multiple coalesced MEMBAR instructions may be in flight, and each coalesced MEMBAR that is issued is assigned a unique identifier. When a thread reaches a MEMBAR instruction, the thread is blocked until execution of the MEMBAR is done. Importantly, threads that have not reached a MEMBAR instruction continue executing while other threads may be blocked.

Additionally, the MMU 328 may be configured to perform an optimization for the MEMBAR.SYS and MEMBAR.GL instructions. Specifically, following a reset or execution of a MEMBAR.SYS or MEMBAR.GL instruction (coalesced or not), the MMU 328 may track if a memory transaction is received that accesses either the system memory or global memory. Since the MMU 328 performs address translation for each of the memory transactions that are received by the MMU 328, the MMU 328 is able to determine which portion of memory (system or global) a transaction accesses. When a MEMBAR.GL is received by the MMU 328 and a memory transaction accessing the global memory has not been received since a reset or execution of the previous MEMBAR instruction (MEMBAR.GL or MEMBAR.SYS), the MMU 328 is configured to discard the MEMBAR instruction and assert the MEMBAR ACK signal to the MEMBAR tracking unit 515 in the L1 cache 320. Similarly, when a MEMBAR.SYS is received by the MMU 328 and a memory transaction accessing either the system memory or the global memory has not been received since a reset or execution of the previous MEMBAR.SYS instruction, the MMU 328 is configured to discard the MEMBAR.SYS instruction and assert the MEMBAR ACK signal to the MEMBAR tracking unit 515 in the L1 cache 320. Finally, when a MEMBAR.SYS is received by the MMU 328 and only a memory transaction accessing the global memory has been received since a reset or execution of the previous MEMBAR.SYS instruction, the MMU 328 is configured to demote the MEMBAR.SYS instruction to a MEMBAR.GL instruction.

FIG. 5A is a block diagram of finite state machine 520, according to one embodiment of the present invention. A deferring mechanism is used by the warp scheduler and instruction unit 312 and the L1 cache 320 to coalesce MEMBAR.SYS and MEMBAR.GL requests. The scheme has three windows: coalescing, transitioning, and blocking. After a "triggering" MEMBAR instruction (a MEMBAR instruction that opens the coalescing window) is received by the memory barrier instruction execution unit 500 within the L1 cache 320, the MEMBAR accept/retry unit 505 records the MEMBAR instruction and enters a coalescing window.

While coalescing, the memory barrier instruction execution unit 500 in the L1 cache 320 will continue to process requests from threads that have not reached a MEMBAR instruction including subsequent MEMBAR instructions. The duration of the coalescing window may be defined by a configurable register setting. At the end of the coalescing window, the MEMBAR accept/retry unit 505 enters a transition period, and requests the SPM 310 to not send any more global memory transaction requests to the L1 cache 320 via the hints signal. The L1 cache 320 still processes memory transaction requests while waiting for the hint to take effect. The transition window is based on nominal pipeline depth. After the transition period, the MEMBAR accept/retry unit 505 will enter a blocking window until the global pending ACK count is zero. Memory accesses to global and system memory are queued in the MMU 328 for output to the L2 Caches 350. In one embodiment, the MEMBAR command bypasses the queue, so the transition period is needed to allow the queued memory accesses to drain. In particular, the queued memory store transactions need to be drained before the MEMBAR command is output to the MMU 328. The global pending ACK count is updated each time a memory access is output from the queue. In an embodiment that does not allow the MEMBAR command to bypass the queue, the global pending ACK count is not needed and can be considered to have a value of zero.

When the global pending ACK count equals zero, the MEMBAR tracking unit 515 sends the MEMBAR command to the MMU 328 and resumes processing of all requests except MEMBAR instructions for threads that have not reached a MEMBAR instruction. The blocking window ends when the MEMBAR ACK is returned. In one embodiment, the memory barrier instruction execution unit 500 has at most one MEMBAR outstanding to the MMU 328 at a time.

The MEMBAR detection circuit 512 is configured to wait for "ACCEPT" from the L1 cache 320 for all previous LD/ST instructions in the same warp before outputting a MEMBAR instruction to the memory barrier instruction execution unit 500. Note that it is easiest to simply check for acceptance of all types of LD/ST, regardless of whether the LD/ST are for shared, local, or global memory. Therefore, the MEMBAR.CTA is effectively executed by the MEMBAR detection circuit 512. After sending a MEMBAR, the MEMBAR detection circuit 512 will not send a further request for a warp until the MEMBAR is acknowledged as done, i.e., until MEMBAR done is output by the memory barrier instruction execution unit 500.

When the MEMBAR accept/retry unit 505 receives and accepts a first MEMBAR instruction, the MEMBAR accept/retry unit 505 transitions from the IDLE state 521 to the coalesce state 522 and opens the coalesce window. A counter in the coalesce window unit 503 is initialized and a minimum coalesce window delay period begins. While in the coalesce state 522, the MEMBAR accept/retry unit 505 accepts subsequent MEMBAR instructions received from the MEMBAR detection circuit 512 and coalesces the subsequent MEMBAR instructions with the first MEMBAR instruction. The type of the coalesced MEMBAR instruction is promoted to MEMBAR.SYS if a MEMBAR.SYS type of MEMBAR instruction is received and the coalesced MEMBAR instruction is a MEMBAR.GL instruction. Alternatively, in another embodiment, when a higher level MEMBAR instruction is received, the existing coalesced MEMBAR instruction is output and the received higher level MEMBAR instruction is deferred, so that only MEMBAR instructions at the same level are combined together into a coalesced MEMBAR instruction.

When the coalesce window unit 503 determines that the minimum coalesce delay period has expired, then the coalesce window is closed and the MEMBAR accept/retry unit 505 transitions from the coalesce state 522 to the transition state 523. In the transition state 523 the MEMBAR accept/retry unit 505 updates the hints/grants signal to discourage requests for accessing global and system memory (requests accessing local and shared memory are not discouraged). In one embodiment, only requests for stores to global and system memory are discouraged. The transition window duration allows time for the hints to take effect. When the transition window duration has expired, the MEMBAR accept/retry unit 505 transitions from the transition state 523 to either the block state 524 or the block_issue state 525.

When the global pending ACK count is non-zero, the MEMBAR accept/retry unit 505 enters the block state 524. Otherwise, the MEMBAR accept/retry unit 505 enters the block_issue state 525. When the MEMBAR accept/retry unit 505 is in the block state 524, the MEMBAR accept/retry unit 505 is in a blocking window and requests (possibly only store requests) that miss in the L1 cache 320 are deferred as "Backoff, write (or read) limit exceeded" as appropriate. When the MEMBAR accept/retry unit 505 is in the block state 524, the MEMBAR accept/retry unit 505 waits for a count of the global pending ACKs to go to zero and continues processing local and shared requests. Requests that hit in the L1 cache 320 are also accepted and processed while the MEMBAR accept/retry unit 505 is in the block state 524. When the count of the global pending ACKs equals zero, the MEMBAR accept/retry unit 505 transitions from the block state 524 to the block_issue state 525.

In the block_issue state 525, the MEMBAR accept/retry unit 505 outputs the MEMBAR command via the MEMBAR tracking unit 515 and transitions to the block_wait state 526. In the block-wait state 526, the MEMBAR accept/retry unit 505 indicates to the SPM 310 that read/write limits are no longer exceeded to allow requests that were deferred during the blocking window to be rescheduled. While in the block_wait state 526, the MEMBAR accept/retry unit 505 defers any subsequent MEMBAR instructions as "backoff, MEMBAR pending" and continues to process other requests. When the MEMBAR tracking unit 515 receives the MEMBAR ACK signal, the MEMBAR accept/retry unit 505 transitions from the block_wait state 526 to the ack state 527 and outputs the MEMBAR done signal before transitioning to the idle state 521. At state ack 527 any MEMBAR instructions that were included in the coalesced MEMBAR have been executed. Any MEMBAR instructions deferred while the MEMBAR accept/retry unit 505 was in the block_wait state 526 may be reissued.

FIG. 5B is a conceptual diagram illustrating the coalescing of memory barrier instructions, according to one embodiment of the present invention. A GST is a global store request that accesses global or system memory and is received by the L1 cache 320 from a first warp. The L1 cache 320 receives a sequence of three GST requests from the first warp. At a time 530, the memory barrier instruction execution unit 500 receives a triggering MEMBAR instruction from the warp and the coalesce window is opened. The memory barrier instruction execution unit 500 receives two additional MEMBAR instructions from second and third warps and coalesces the two additional MEMBAR instructions with the triggering MEMBAR instruction to produce a coalesced MEMBAR instruction. At time 535 the coalesce window closes and the transition window opens. During the transition window a sequence of three global store requests from other warps are processed. At time 540 the transition window closes and the blocking window opens.

During a first portion of the blocking window the global pending ACK count is reduced to zero and at time 545 the coalesced MEMBAR instruction is issued by the memory barrier instruction execution unit 500. While the blocking window is open subsequent MEMBAR instructions are deferred. While the blocking window is open and the global pending ACK count is not zero, global store requests that miss in the L1 cache 320 are deferred. Local and shared requests are processed during the blocking window. At time 550 the MEMBAR ACK is received by the memory barrier instruction execution unit 500 and at time 555 the MEMBAR done signal is output by the memory barrier instruction execution unit 500, closing the blocking window. At time 560 a second triggering MEMBAR instruction is received by the memory barrier instruction execution unit 500.

When a halt condition occurs the coalescing window is closed and the state of the memory barrier instruction execution unit 500 is preserved. This ensures that the coalesced MEMBAR is output before new global stores after the halted condition is removed. Before the L1 cache 320 returns to the run state, the L1 cache 320 replays any deferred global stores, waits for the global ACKs (global pending ACK count to reach zero), and then sends the coalesced MEMBAR to the MMU 328.

Figure 6:
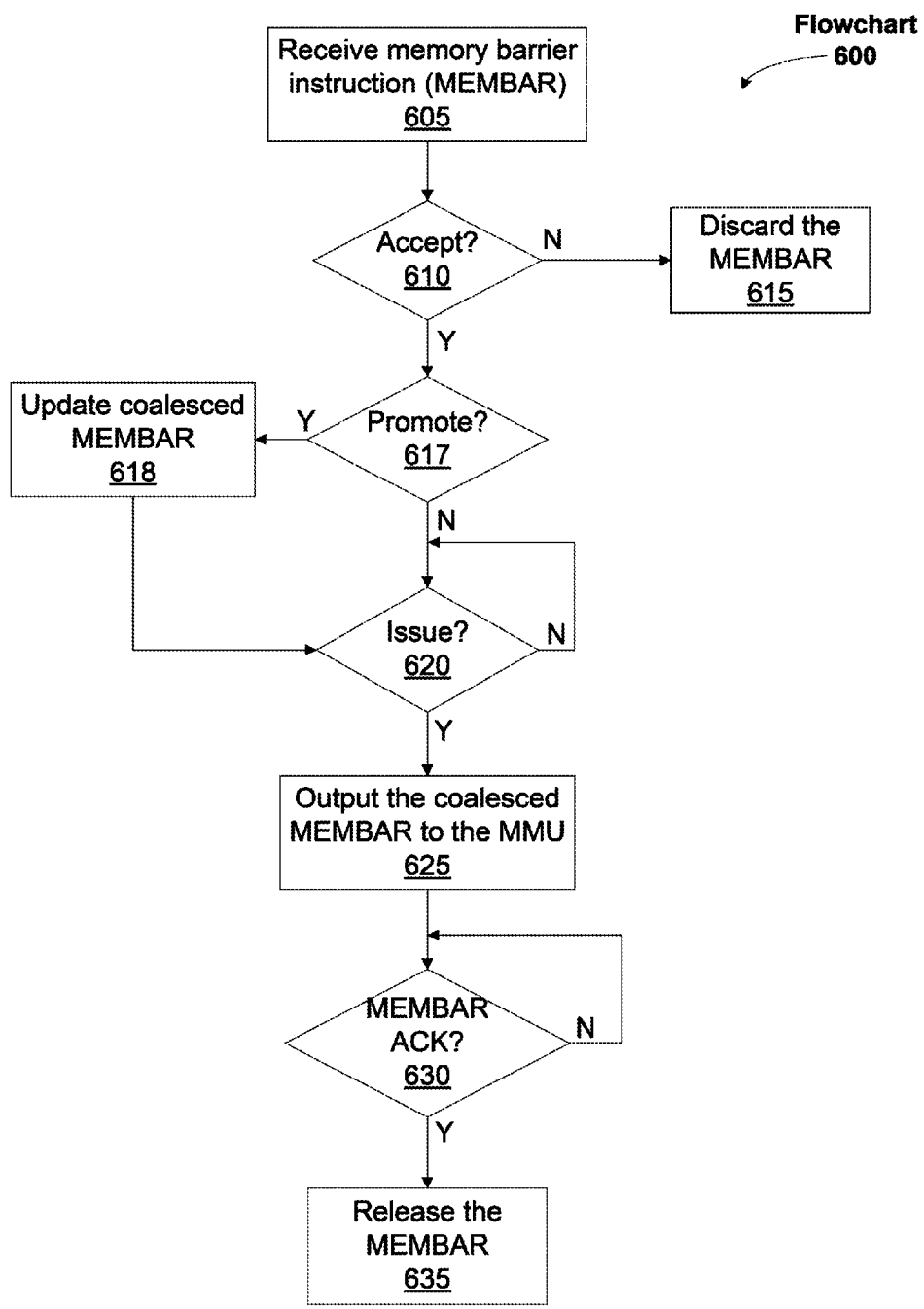
FIG. 6 is a flow diagram of method steps for coalescing memory barrier instructions, according to one embodiment of the present invention.

FIG. 6 is a flow diagram 600 of method steps for coalescing memory barrier instructions, according to one embodiment of the present invention. At step 605 the memory barrier instruction execution unit 500 receives a memory barrier instruction (MEMBAR). The MEMBAR instruction may be received from the MEMBAR detection circuit 512 or as an external MEMBAR instruction. At step 610 the MEMBAR accept/retry unit 505 determines if the MEMBAR instruction can be accepted. Whether or not the MEMBAR instruction can be accepted depends on the state in which the MEMBAR accept/retry unit 505 is operating in. In particular, MEMBAR instructions can be accepted when the MEMBAR accept/retry unit 505 is in the idle state 521 or the coalesce state 522. If, at step 610 the MEMBAR instruction is not accepted, then at step 615 the MEMBAR instruction is discarded by the MEMBAR accept/retry unit 505 and the MEMBAR accept output signal is negated.

If, at step 610 the MEMBAR instruction is accepted by the MEMBAR accept/retry unit 505, then at step 617 the MEMBAR instruction determines if the coalesce MEMBAR instruction should be promoted because the MEMBAR instruction received in step 605 is a higher level MEMBAR instruction (MEMBAR.SYS is considered higher level compared with MEMBAR.GL and MEMBAR.GL is considered higher level compared with MEMBAR.CTA). If, at step 617 the MEMBAR instruction determines that the coalesce MEMBAR instruction should be promoted, then at step 618 the coalesced MEMBAR is updated to the higher level.

At step 620 the MEMBAR accept/retry unit 505 determines if the coalesced MEMBAR instruction can be issued, and, if not, the MEMBAR accept/retry unit 505 repeats step 620. The coalesced MEMBAR instruction may be issued when the MEMAR accept/retry unit 505 is in the blocking window and the global pending ACK count equals zero. When the coalesced MEMBAR instruction can be issued at step 620, then at step 625 the MEMBAR tracking unit 515 outputs the coalesced MEMBAR instruction to the MMU 328. At step 630 the MEMBAR tracking unit 515 waits for the MEMBAR ACK signal that is received when all of the memory transactions have been committed to memory at the level specified by the coalesced MEMBAR instruction (global or system level). When the MEMBAR ACK signal is received, then at step 635 the MEMBAR tracking unit 515 informs the MEMBAR accept/retry unit 505 and the MEMBAR is released by outputting the MEMBAR done signal.

Although the method steps are described in conjunction with the systems of FIGS. 1, 2, 3A, 3B, 3C, and 4, persons skilled in the art will understand that any system configured to perform the method steps, in any order, is within the scope of the inventions.

Using a hierarchical memory barrier instruction may improve performance since the different levels of memory barrier instruction have different execution latencies.

When threads execute independently, it may be advantageous to coalesce two or more memory barrier instructions for different threads that fall within a temporal window to execute a coalesced memory barrier instruction rather than executing separate memory barrier instructions for each thread.

N-Way Memory Barrier Operation Coalescing

While coalescing multiple memory barrier instructions amortizes the latency of executing a single memory barrier instruction over multiple memory barrier instructions, only a single coalesced memory barrier instruction may be pending at a time. After the coalescing window is closed, any subsequent memory barrier instruction and instructions that follow that subsequent memory barrier instruction are not accepted by the memory barrier instruction execution unit 500.

N-way buffering of memory barrier instruction coalescing constructs a tagged memory transaction stream including sets of memory commands where each memory command is tagged with a coalescing index. A coalesced memory barrier instruction follows each set of memory transactions and has the same coalescing index as the preceeding set of memory transactions. A first phase of coalescing the memory barrier instructions may be overlapped with a second phase of transmitting the tagged memory command stream to the MMU 328. In other words, a first coalesced memory barrier instruction may be transmitted to the MMU 328 while subsequent memory commands are accepted and while subsequent memory barrier instructions are coalesced to generate a second coalesced memory barrier instruction.

Figure 7A:
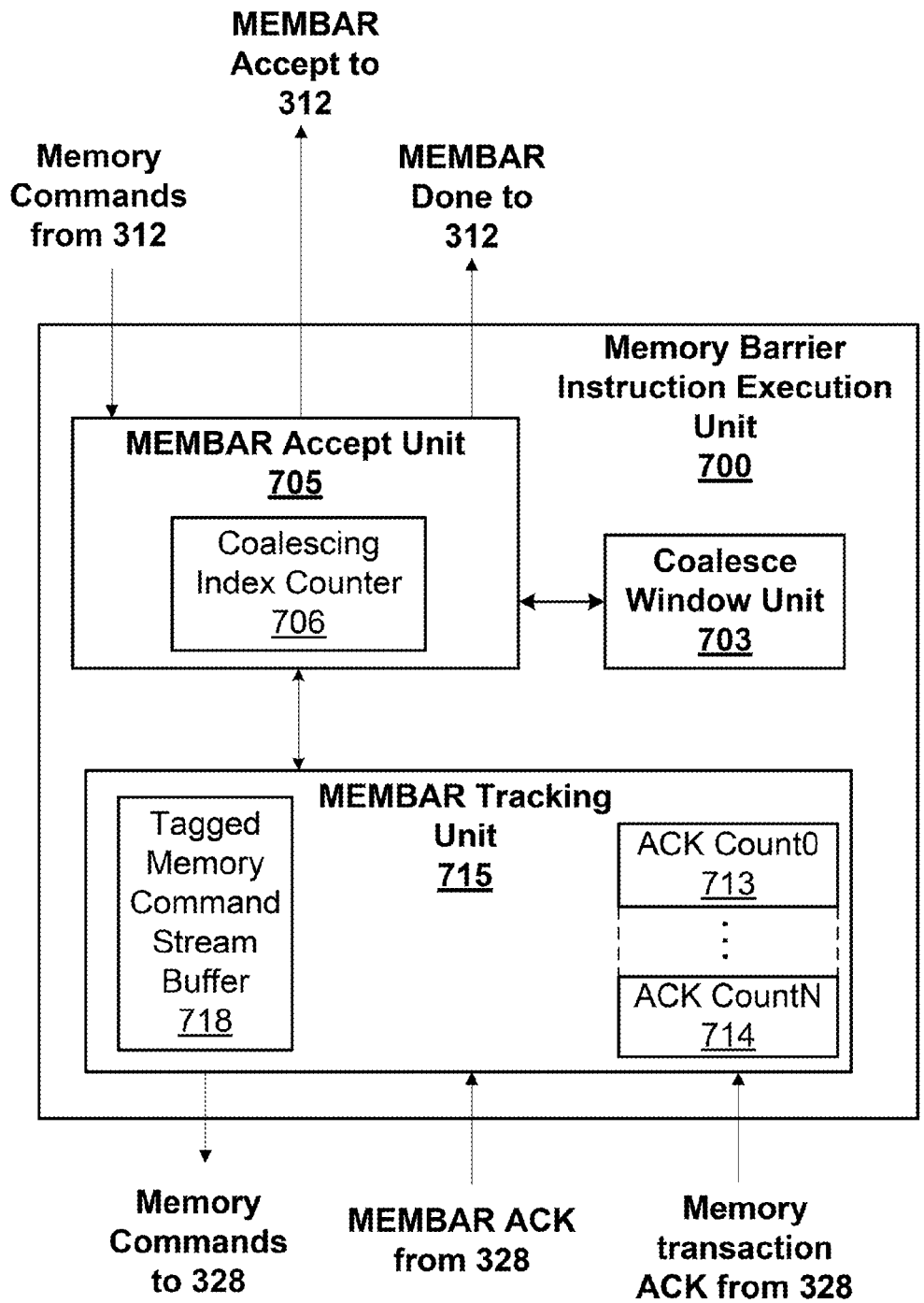
FIG. 7A is another block diagram of a memory barrier instruction execution unit, according to one embodiment of the present invention.

FIG. 7A is another block diagram of a memory barrier instruction execution unit 700, according to one embodiment of the present invention. In some embodiments the memory barrier instruction execution unit 500 is within each L1 cache 320 to coalesce memory barrier instructions, e.g., MEMBAR.CTA, MEMBAR.GL, and MEMBAR.SYS, across multiple thread groups.

Memory barrier instruction execution unit 700 includes a MEMBAR accept unit 705, a coalesce window unit 703, and a MEMBAR tracking unit 715. The warp scheduler and instruction unit 312 outputs a stream of memory commands including memory transactions (load and store instructions) and memory barrier instructions to a MEMBAR accept unit 705 within the memory barrier instruction execution unit 700. Each memory transaction is executed in parallel by the threads in a particular thread group and the warp scheduler and instruction unit 312 may interleave instructions for different thread groups for output while ensuring that the program instruction order is maintained for each individual thread group.

Before dispatching a memory barrier instruction for a thread group to the memory barrier instruction execution unit 700, the warp scheduler and instruction unit 312 waits for all memory transactions dispatched to the memory barrier instruction execution unit 700 for the thread group to be accepted. Unlike the memory barrier instruction execution unit 500, the memory barrier instruction execution unit 700 does not defer memory barrier instructions. Once a memory barrier instruction is dispatched for a thread group, the warp scheduler and instruction unit 312 cannot dispatch any new memory transactions for the same thread group. In one embodiment, the warp scheduler and instruction unit 312 marks the thread group as "waiting" or "sleeping" and saves the coalescing index as well. When processing of the memory barrier instruction is complete, the warp scheduler and instruction unit 312 wakes up the thread group and resumes dispatching of memory commands for the thread group.

The MEMBAR accept unit 705 accepts the memory commands dispatched by the warp scheduler and instruction unit 312 and when a triggering MEMBAR instruction is received, the MEMBAR accept unit 705 outputs a MEMBAR accept signal to the warp scheduler and instruction unit 312. The MEMBAR accept signal indicates that the triggering MEMBAR instruction is accepted by the MEMBAR accept unit 705. The MEMBAR accept includes a coalescing index having a value between 0 and N, inclusive, that is provided by a coalescing index counter 706. All of the memory commands received after the triggering MEMBAR instruction are tagged with the coalescing index that was output with the MEMBAR accept signal in response to the triggering MEMBAR instruction. MEMBAR instructions received by the MEMBAR accept unit 705 after the triggering MEMBAR instruction may be coalesced during a coalescing window to generate a coalesced MEMBAR instruction that is associated with the coalescing index that was output.

The tagged memory commands and tagged coalesced MEMBAR instruction are combined to construct a tagged memory command stream that is stored in the tagged memory command stream buffer 718 within the MEMBAR tracking unit 715. Any memory commands that are received by the MEMBAR accept unit 705 before the first triggering MEMBAR instruction are also stored in the tagged memory command stream buffer 718.

A coalesce (temporal) window is opened by the coalesce window unit 703 when the triggering MEMBAR is received. The minimum duration of the coalescing window controlled by a coalesce timeout counter and is configurable from 0 clocks (disabled) to on the order 1000's of clocks. This allows tuning in the amount of memory barrier instructions that are coalesced. The coalesce window resulting in the generation of MEMBAR instruction n, where n is the coalescing index associated with the MEMBAR instruction, is closed when the coalesce timeout counter has expired and a MEMBAR ACK for the MEMBAR instruction corresponding to the coalescing index of (n−(N−1)) % N is received from the MMU 328. For example, when N=3 the coalesce window unit 703 may wait until MEMBAR n−2 is ACKed to close the coalesce window associated with coalescing index n.

The MEMBAR tracking unit 515 receives a MEMBAR ACK (acknowledgement) signal from the MMU 328 when processing of each coalesced MEMBAR is completed. When the MEMBAR ACK is received by the MEMBAR tracking unit 715, the MEMBAR accept unit 705 outputs the MEMBAR done to the warp scheduler and instruction unit 312 and execution of the MEMBAR instruction is complete. The MEMBAR done signal includes the coalescing index n associated with the coalesced MEMBAR. Execution of any thread groups that were blocked waiting for a MEMBAR instruction to be done that is included in the coalesced MEMBAR index n resumes. In other words, the MEMBAR DONE to 312 provides feedback to the warp scheduler and instruction unit 312 that the coalesced MEMBAR associated with index n has completed and warps waiting for the coalesced MEMBAR index n may be released.

The MEMBAR tracking unit 715 includes N ACK counters, ACK count0 713 through ACK countN−1 714 that track the acknowledge signals received in response to each memory transaction that is output from the tagged memory command stream buffer 718. The acknowledge signals for the different coalescing indices are tracked separately. Specifically, when a memory transaction tagged with a particular coalescing index is transmitted to the MMU 328 by the MEMBAR tracking unit 715, the ACK counter associated with the particular coalescing index is incremented. When an acknowledgement (ACK) for the particular coalescing index is received by the MEMBAR tracking unit 715 from the MMU 328, the ACK counter associated with the particular coalescing index is decremented. The memory barrier instruction tagged with the particular coalescing index can only by output by the MEMBAR tracking unit 715 when the ACK counter associated with the particular coalescing index has a value of zero, indicating that all of the memory transactions for the particular coalescing index have been acknowledged by the MMU 328.

Figure 7B:
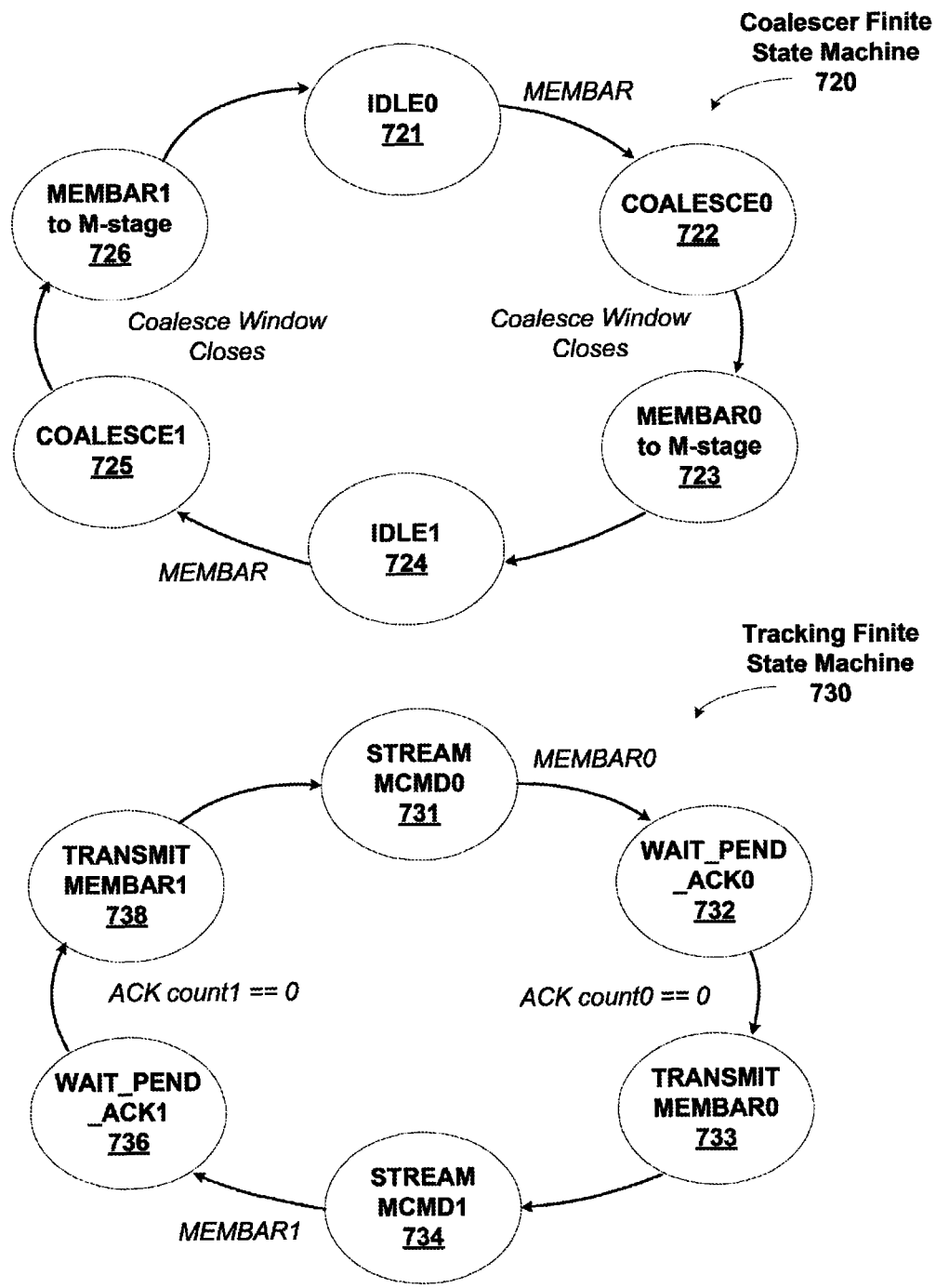
FIG. 7B is a block diagram of finite state machines, according to one embodiment of the present invention.

FIG. 7B is a block diagram of a coalescer finite state machine 720 and a tracking finite state machine 730, according to one embodiment of the present invention. The coalescer finite state machine 720 and the tracking finite state machine 730 illustrate the functionality provided by the MEMBAR accept unit 705 and the MEMBAR tracking unit 715, respectively. The coalescer finite state machine 720 controls the interaction between the warp scheduler and instruction unit 312 and the MEMBAR coalescing window. The tracking finite state machine 730 controls the transmission of the coalesced MEMBAR instructions and the corresponding memory transactions. Note that for the following description, N=2 and all memory transactions are assumed to the to the same memory space (global address space) and tracked by the MEMBAR operations.

An IDLE0 721 state of the coalescer finite state machine 720 is the reset state. While in the IDLE0 721 state, the MEMBAR accept unit 705 accepts memory commands. Memory transactions that are received are tagged with the coalescing index n (n=0 after reset) and output to the tagged memory command stream buffer 718. When a triggering MEMBAR instruction is received, the MEMBAR accept unit 705 transitions from the IDLE0 721 state to a COALESCE0 722 state. A first coalescing window is opened and the MEMBAR accept unit 705 provides the warp scheduler and instruction unit 312 with the coalescing index 0. Memory transactions that are received after the triggering memory barrier instruction are also tagged with the coalescing index n (n=0 after reset) and output to the tagged memory command stream buffer 718. The memory transactions that are tagged with the coalescing index 0 are a first set of memory transactions. Memory barrier instructions that are received while the MEMBAR accept unit 705 is in the COALESCE0 722 state are accepted and coalesced with the triggering memory barrier instruction to generate a coalesced memory barrier instruction associated with the coalescing index 0.

When the coalescing window closes, the MEMBAR accept unit 705 transitions from the COALESCE0 722 state to the MEMBAR0 to M-stage 723 state. As previously explained, the coalescing window is closed when the coalesce timeout counter has expired and a MEMBAR ACK for the MEMBAR instruction corresponding to the coalescing index of (n−(N−1)) % N is received from the MMU 328. In the MEMBAR0 to M-stage 723 state the MEMBAR accept unit 705 tags the coalesced memory barrier instruction with the coalescing index 0 and inserts the coalesced memory barrier instruction into the tagged memory command stream buffer 718 immediately following the last memory transaction in the first set of memory transactions. The MEMBAR accept unit 705 then increments (modulo N so that the counter wraps) the coalescing index and transitions from the MEMBAR0 to M-stage 723 state to an IDLE1 724 state.

While in the IDLE1 724 state, the MEMBAR accept unit 705 accepts memory commands. Memory transactions that are received are tagged with the coalescing index 1 and output to the tagged memory command stream buffer 718. When a second triggering MEMBAR instruction is received, the MEMBAR accept unit 705 transitions from the IDLE1 724 state to a COALESCE1 725 state. A second coalescing window is opened and the MEMBAR accept unit 705 acknowledges that the second triggering MEMBAR instruction is accepted and provides the warp scheduler and instruction unit 312 with the coalescing index 1. Memory transactions that are received after the second triggering memory barrier instruction are also tagged with the coalescing index 1 and output to the tagged memory command stream buffer 718. The memory transactions that are tagged with the coalescing index 1 are a second set of memory transactions. Memory barrier instructions that are received while the MEMBAR accept unit 705 is in the COALESCE1 725 state are accepted and coalesced with the second triggering memory barrier instruction to generate a second coalesced memory barrier instruction associated with the coalescing index 1.

When the second coalescing window closes, the MEMBAR accept unit 705 transitions from the COALESCE1 725 state to the MEMBAR1 to M-stage 726 state. In the MEMBAR1 to M-stage 726 state the MEMBAR accept unit 705 tags the second coalesced memory barrier instruction with the coalescing index 1 and inserts the second coalesced memory barrier instruction into the tagged memory command stream buffer 718 immediately following the last memory transaction in the second set of memory transactions. The MEMBAR accept unit 705 then increments (modulo N so that the counter wraps) the coalescing index and transitions from the MEMBAR1 to M-stage 726 state to the IDLE0 721 state. When N is greater than 2, additional sets of IDLE, COALESCE, and MEMBAR to M-stage states are included between the MEMBAR1 to M-stage 726 and the IDLE0 721 states to implement the N-way memory barrier operation coalescing.

A STREAM MCMD0 731 state of the tracking finite state machine 730 is the reset state. While in the STREAM MCMD0 731, the MEMBAR tracking unit 715 streams tagged memory transactions from the tagged memory command stream buffer 718 to the MMU 328. The ACK Count0 713 is incremented for each memory transaction having a coalescing index of 0 that is transmitted. The ACK Count0 713 is decremented for each memory transaction ACK having a coalescing index of 0 that is received by the MEMBAR tracking unit 715. When a MEMBAR instruction is reached in the tagged memory command stream buffer 718, the MEMBAR tracking unit 715 transitions from the STREAM MCMD0 731 state to a WAIT_PEND_ACK0 732 state. When the ACK count0 713 equals zero, indicating that all of the transmitted memory transactions tagged with the coalescing index 0 have been acknowledged by the MMU 328, the MEMBAR tracking unit 715 transitions from the WAIT_PEND_ACK0 732 state to the TRANSMIT MEMBAR0 733 state.

While in the WAIT_PEND_ACK0 732 state, the MEMBAR tracking unit 715 may be configured to transmit tagged memory transactions having a tag that does not equal 0 while also updating the corresponding ACK count for transmissions and ACKs. The order of the memory transaction ACKs returned from MMU 328 does not necessarily match the order in which the memory transactions were sent to the MMU 328.

In the TRANSMIT MEMBAR0 733 state the MEMBAR tracking unit 715 transmits the tagged coalesced memory barrier instruction (n=0). When the MMU 328 completes processing of the tagged coalesced memory barrier instruction, the MMU 328 asserts the MEMBAR ACK input to the MEMBAR tracking unit 715 and the coalesce window unit 703 closes a coalescing window corresponding to the coalescing index n+1 for N=2 or the coalescing index (n+(N−1)) % N for any N (assuming that the coalescing timeout counter has expired). The MEMBAR tracking unit 715 transitions from the TRANSMIT MEMBAR0 733 state to the STREAM MCMD1 734 state.

While in the STREAM MCMD1 734, the MEMBAR tracking unit 715 streams tagged memory transactions in the second set of memory transactions from the tagged memory command stream buffer 718 to the MMU 328. The ACK Count1 is incremented for each memory transaction having a coalescing index of 1 that is transmitted. The ACK Count1 is decremented for each memory transaction ACK having a coalescing index of 1 that is received by the MEMBAR tracking unit 715.

When a MEMBAR instruction is reached in the tagged memory command stream buffer 718, the MEMBAR tracking unit 715 transitions from the STREAM MCMD1 734 state to a WAIT_PEND_ACK1 736 state. When the ACK count1 equals zero, indicating that all of the transmitted memory transactions tagged with the coalescing index 1 have been acknowledged by the MMU 328, the MEMBAR tracking unit 715 transitions from the WAIT_PEND_ACK1 736 state to the TRANSMIT MEMBAR1 738 state. While in the WAIT_PEND_ACK1 736 state, the MEMBAR tracking unit 715 may be configured to transmit tagged memory transactions having a tag that does not equal 1 while also updating the corresponding ACK count for transmissions and ACKs.

In the TRANSMIT MEMBAR1 738 state the MEMBAR tracking unit 715 transmits the tagged coalesced memory barrier instruction (n=1). When the MMU 328 completes processing of the tagged coalesced memory barrier instruction, the MMU 328 asserts the MEMBAR ACK input to the MEMBAR tracking unit 715 and the coalesce window unit 703 closes a coalescing window corresponding to the coalescing index n−1 (n+1=0 when N=2), assuming that the coalescing timeout counter has expired.

Figure 7C:
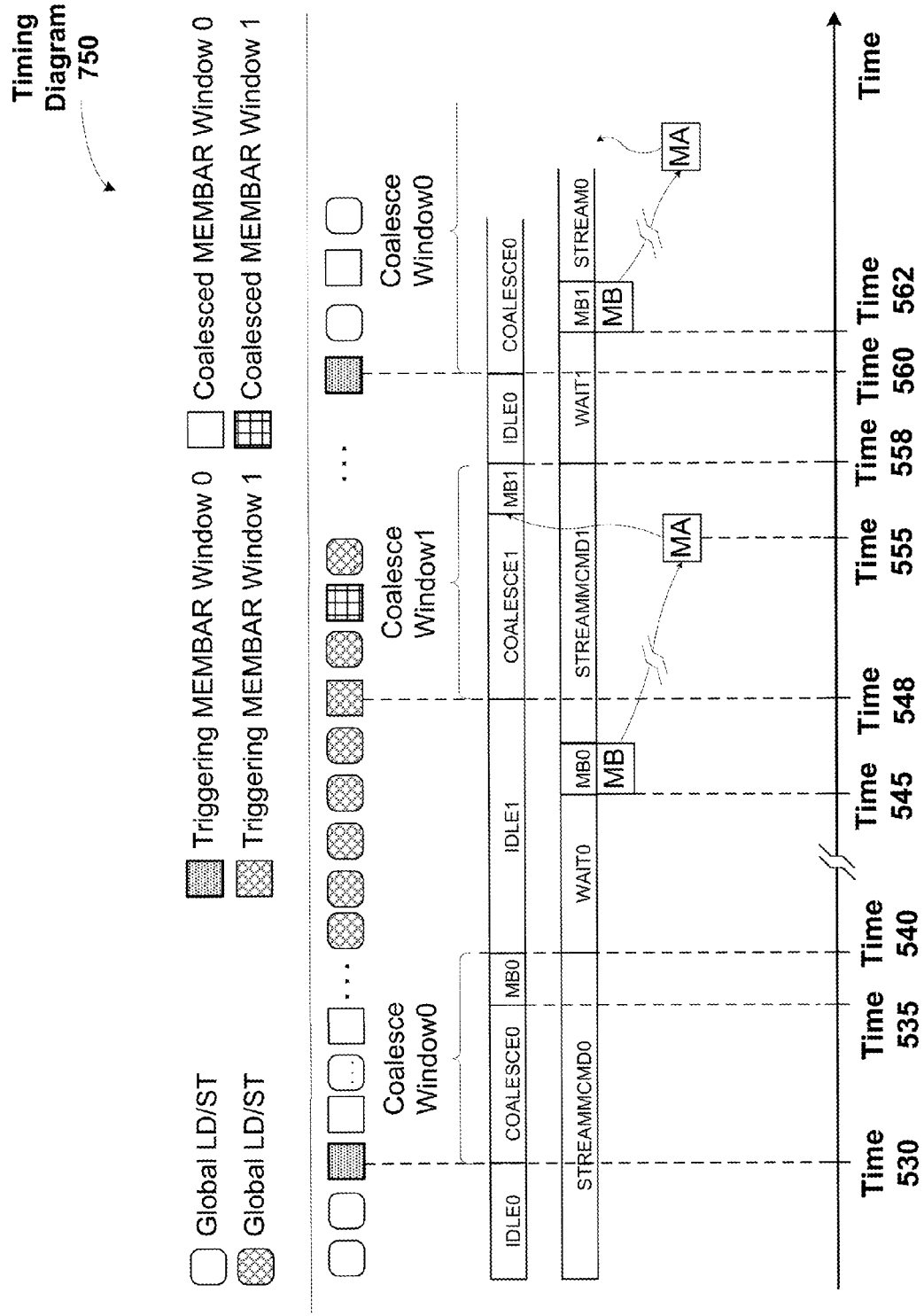
FIG. 7C is another conceptual diagram illustrating the coalescing of memory barrier instructions, according to one embodiment of the present invention.

FIG. 7C is another conceptual diagram illustrating a timing diagram 750 for the coalescing of memory barrier instructions, according to one embodiment of the present invention. Note that at any one time, there is only one MEMBAR outstanding within the MEMORY subsystem, so the complexity in overlapping MEMBAR operations is contained to the LSU 303. In one embodiment, the coalescing index is output with the MEMBAR and the MMU 328 may process multiple MEMBARs simultaneously.

While in the IDLE0 721 state, the MEMBAR accept unit 705 accepts memory commands (shown as global load/store operations) that are tagged with the coalescing index 0 and output to the tagged memory command stream buffer 718. The M-stage finite state machine 730 is in the STREAM MCMD0 731 state and the tagged memory commands are read from the tagged memory command stream buffer 718 and transmitted to the MMU 328.

At time 530 a triggering MEMBAR is received and a coalesce window 0 is opened and the MEMBAR accept unit 705 provides the warp scheduler and instruction unit 312 with the coalescing index 0. When the triggering MEMBAR instruction is received, the MEMBAR accept unit 705 transitions from the IDLE0 721 state to a COALESCE0 722 state. MEMBAR instructions received during the coalesce window 0 are combined with the triggering MEMBAR instruction and are not output to the tagged memory command stream buffer 718. Memory commands that are received during the coalesce window 0 are tagged with the coalescing index 0 and are output to the tagged memory command stream buffer 718. The tagged memory commands are read from the tagged memory command stream buffer 718 and transmitted to the MMU 328.

At time 535 the coalescing timeout expires and the T-stage finite state machine 720 transitions from the COALESCE0 722 state to the MEMBAR0 to M-stage 723 state and coalescing window 0 closes. When the coalesced MEMBAR instruction is output by the MEMBAR accept unit 705 at time 535, the coalescing index counter 706 increments the coalescing index and memory commands that are received after the coalesce window 0 is closed are tagged with the coalescing index 1 and are output to the tagged memory command stream buffer 718. At time 540 the T-stage finite state machine 720 transitions from the MEMBAR0 to M-stage 723 state to the IDLE1 724 and the M-stage finite state machine 730 transitions from the STREAM MCMD0 731 state to the WAIT_PEND_ACK0 732 state. The MEMBAR tracking unit 715 waits for the ACK count0 713 to become zero before transitioning to the TRNSMIT MEMBAR0 733 STATE AT TIME 545 and transmitting the coalesced MEMBAR associated with coalescing index 0.

At time 548 a second triggering MEMBAR is received and a coalesce window 1 is opened and the MEMBAR accept unit 705 provides the warp scheduler and instruction unit 312 with the coalescing index 1. The T-stage finite state machine 720 transitions from the IDLE1 724 state to the COALESCE1 725 state. MEMBAR instructions received during the coalesce window 1 are combined with the second triggering MEMBAR instruction and are not output to the tagged memory command stream buffer 718. Memory commands that are received during the coalesce window 1 are tagged with the coalescing index 1 and are output to the tagged memory command stream buffer 718. The tagged memory commands are read from the tagged memory command stream buffer 718 and transmitted to the MMU 328.

At time 555 the MMU 328 transmits an acknowledgement (ACK) signal for the first coalesced MEMBAR. When the ACK is transmitted by the MEMBAR tracking unit 715 to the memory barrier instruction execution unit 700 the T-stage finite state machine 720 transitions from the COALESCE1 725 state to the MEMBAR1 to M-stage 726 state and coalescing window 1 closes (the coalescing window timeout had already expired). At time 558 the T-stage finite state machine 720 transitions from the MEMBAR1 to M-stage 726 state to the IDLE0 721 and the M-stage finite state machine 730 transitions from the STREAM MCMD0 731 state to the WAIT_PEND_ACK0 732 state.

The MEMBAR tracking unit 715 waits for the ACK count1 to become zero before transitioning to the TRANSMIT MEMBAR1 738 STATE at time 562 and transmitting the coalesced MEMBAR associated with coalescing index 1 at time 562. At time 560 a second triggering MEMBAR is received and a second coalesce window 0 is opened and the MEMBAR accept unit 705 provides the warp scheduler and instruction unit 312 with the coalescing index 0. The T-stage finite state machine 720 transitions from the IDLE0 721 state to the COALESCE0 722 state.

Figure 8A:
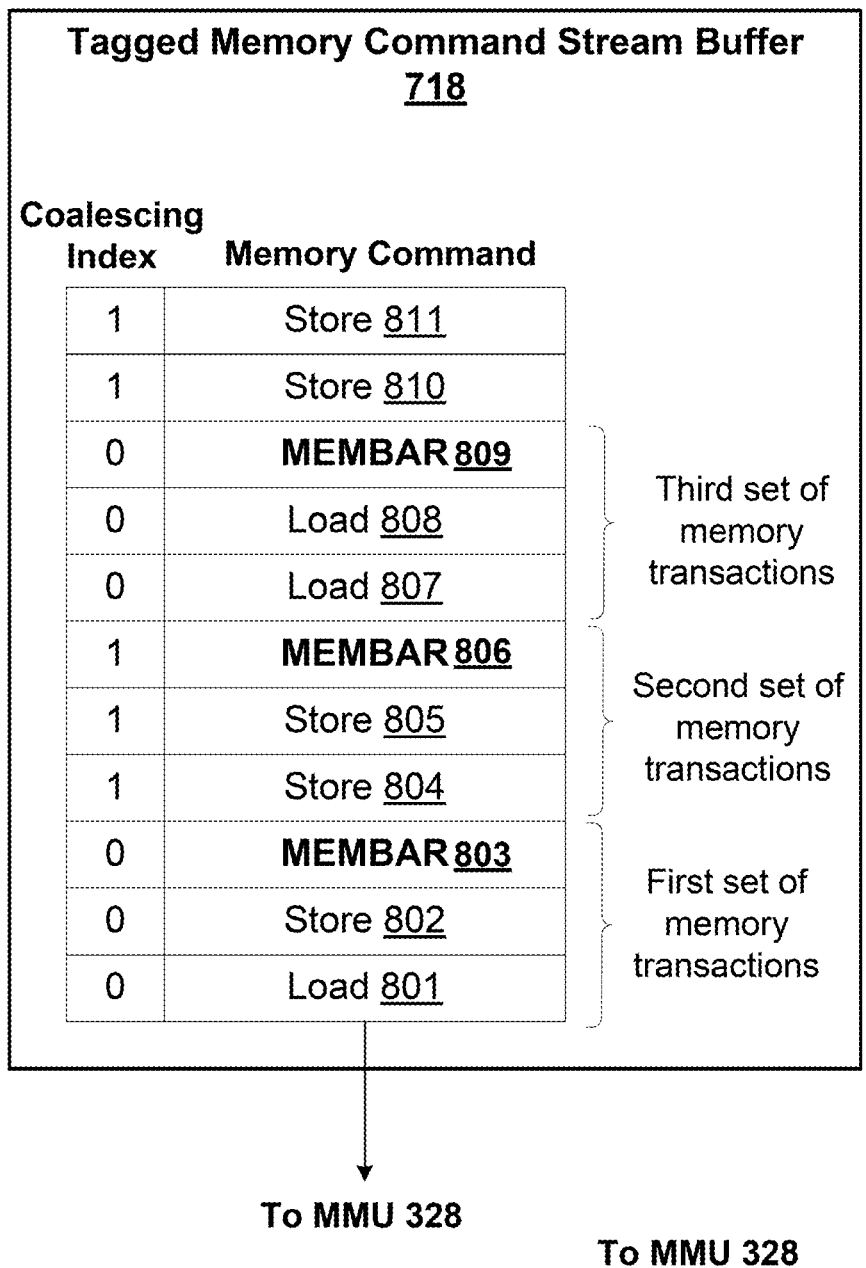
FIG. 8A is a conceptual diagram of illustrating the tagged memory command stream buffer of FIG. 7A, according to one embodiment of the present invention.

FIG. 8A is a conceptual diagram of illustrating the tagged memory command stream buffer 718 of FIG. 7A, according to one embodiment of the present invention. The MEMBAR accept unit 705 constructs the tagged memory command stream buffer 718 including a first set of memory transactions tagged with a coalescing index of 0, e.g., load 801, store 803, and a first MEMBAR 803. A second set of memory transactions tagged with a coalescing index of 1, e.g., a store 804, store 805, and a MEMBAR 806, follow the first set of memory transactions. A third set of memory transactions tagged with a coalescing index of 0, e.g., a load 807, load 808, and a MEMBAR 809, follow the second set of memory transactions. A fourth set of memory transactions tagged with a coalescing index of 1, e.g., a store 810 and store 811 follow the third set of memory transactions.

Figure 8B:
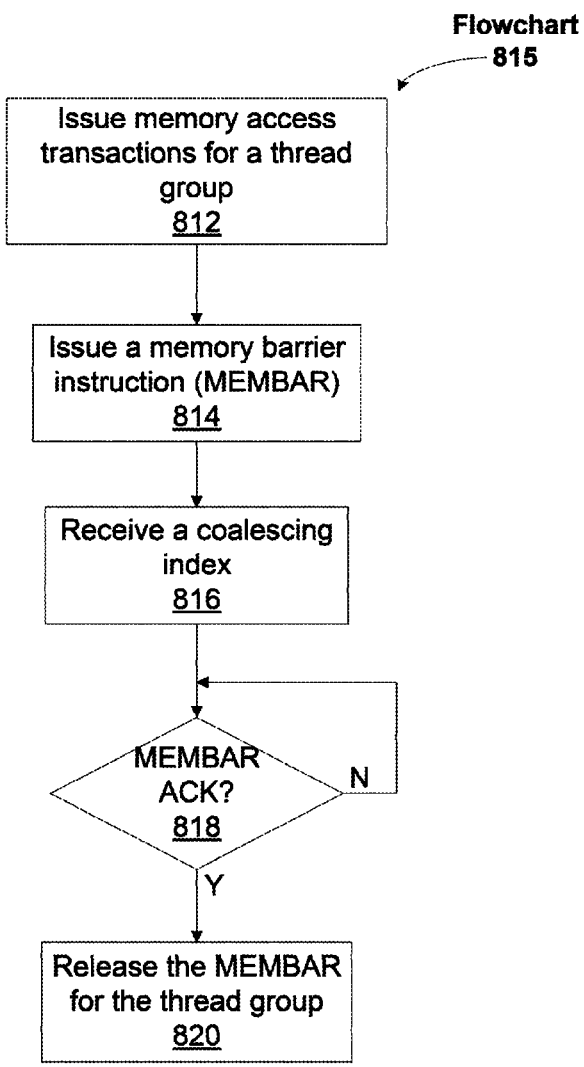
FIG. 8B is another flow diagram of method steps for processing memory barrier instructions, according to one embodiment of the present invention.

FIG. 8B is another flowchart 815 of method steps for processing memory barrier instructions, according to one embodiment of the present invention. Although the method steps are described in conjunction with the systems of FIGS. 1, 2, 3A, 3B, 3C, 7A, 7B, and 8A, persons of ordinary skill in the art will understand that any system configured to perform the method steps, in any order, is within the scope of the inventions.

At a step 812 the warp scheduler and instruction unit 312 issues memory access transactions for a thread group that are received by the memory barrier instruction execution unit 700. At step 814 the warp scheduler and instruction unit 312 issues a memory barrier instruction (MEMBAR) for a first thread group. The MEMBAR is received by the memory barrier instruction execution unit 700 and the warp scheduler and instruction unit 312 blocks the execution of memory transactions for the first thread group that are after the first memory barrier instruction in program order. However, the warp scheduler and instruction unit 312 may continue issuing memory access transactions for other thread groups.

At step 816 the warp scheduler and instruction unit 312 receives a coalescing index from the memory barrier instruction execution unit 700. At step 818 the warp scheduler and instruction unit 312 determines if a MEMBAR ACK is received for the MEMBAR corresponding to the coalescing index received at step 816. When the MEMBAR ACK is received from the memory barrier instruction execution unit 700, the warp scheduler and instruction unit 312 proceeds to step 820 and releases the MEMBAR for the one or more thread groups waiting for index n. After the MEMBAR is released, the warp scheduler and instruction unit 312 may resume issuing memory access transactions for the thread group. Releasing the first memory barrier allows execution of the memory transactions for the first thread group and any other thread groups coalesced with the first thread group that are after the first memory barrier instruction in program order.

Figure 8C:
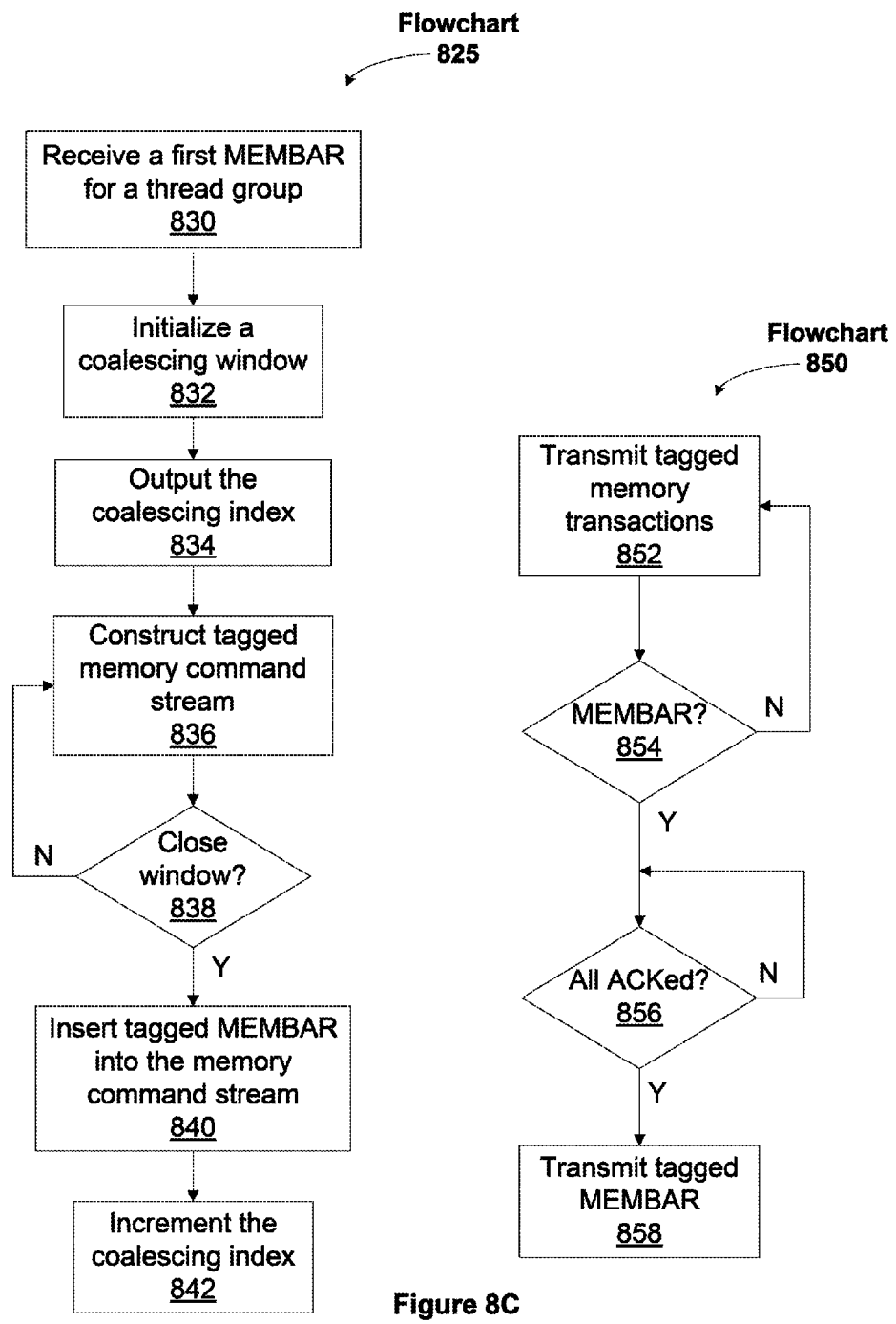
FIG. 8C is another flow diagram of method steps for N-way memory barrier instruction coalescing, according to one embodiment of the present invention.

FIG. 8C illustrates flowcharts 825 and 850 of method steps for N-way memory barrier instruction coalescing, according to one embodiment of the present invention. In one embodiment, the steps in the flowchart 825 are performed by the MEMBAR accept unit 705 and the steps in the flowchart 850 are performed by the MEMBAR tracking unit 715. Although the method steps are described in conjunction with the systems of FIGS. 1, 2, 3A, 3B, 3C, 7A, 7B, and 8A, persons of ordinary skill in the art will understand that any system configured to perform the method steps, in any order, is within the scope of the inventions.

At step 830 the MEMBAR accept unit 705 receives a first MEMBAR for a thread group. At step 832 the MEMBAR accept unit 705 initializes the coalescing timeout counter and opens a first coalescing window. At step 834 the MEMBAR accept unit 705 outputs the coalescing index to the warp scheduler and instruction unit 312. At step 836 the MEMBAR accept unit 705 constructs a tagged memory command stream including memory transactions that are not for the first thread group and that are tagged with the coalescing index.

At step 838 the MEMBAR accept unit 705 determines if the first coalescing window should be closed. In one embodiment, a coalescing window is closed when the coalescing timeout has expired and when a MEMBAR ACK for the transmitted MEMBAR corresponding to the coalescing index n−1 is received from the MMU 328, where the current coalescing index is n. The MMU 328 returns a MEMBAR ACK after determining that all memory transactions that occur prior to the MEMBAR instruction corresponding to a particular coalescing index in the tagged memory command stream are committed to memory.

If, at step 838 the MEMBAR accept unit 705 determines that the coalescing window cannot be closed, then the MEMBAR accept unit 705 returns to step 836. Otherwise, at step 840, the MEMBAR accept unit 705 inserts a MEMBAR instruction that is tagged with the coalescing index into the memory command stream immediately following the last memory transaction tagged with the same coalescing index. At step 842 the MEMBAR accept unit 705 increments the coalescing index.

The steps in the flowchart 825 may be performed by the MEMBAR accept unit 705 simultaneously with the steps in the flowchart 850 that are performed by the MEMBAR tracking unit 715. For example, the MEMBAR accept unit 705 may be coalescing MEMBAR instructions to generate a coalesced MEMBAR instruction to be tagged with a coalescing index n+1 while the MEMBAR tracking unit 715 transmits memory transactions tagged with a coalescing index n.

At step 852 the MEMBAR tracking unit 715 transmits tagged memory transactions in the tagged memory command stream to the MMU 328. At step 854 the MEMBAR tracking unit 715 determines if the next memory command in the tagged memory command stream is a MEMBAR instruction, and, if not, then the MEMBAR tracking unit 715 returns to step 852. Otherwise, at step 856, the MEMBAR tracking unit 715 determines if all of the memory transactions that have been transmitted have been acknowledged by the MMU 328, i.e., if the ACK count for the coalescing index equals zero. When the MEMBAR tracking unit 715 determines that all of the memory transactions that have been transmitted have been acknowledged by the MMU 328, the MEMBAR tracking unit 715 transmits the tagged MEMBAR instruction to the MMU 328 at step 858.

One advantage of the disclosed system and method is that when a first memory barrier is received for a first thread group execution of subsequent memory operations for the first thread group are held until the first memory barrier is executed. Subsequent memory barriers for different thread groups may be coalesced with the first memory barrier to produce a coalesced memory barrier that represents memory barriers for multiple thread groups. When the coalesced memory barrier is being processed by the MMU 328, execution of subsequent memory operations for the first thread group and the different thread groups is suspended. However, memory operations for other thread groups that are not affected by the coalesced memory barrier instruction may be transmitted to the MMU 328 for execution. Additionally, compared with a system that only supports output of a single coalesced memory barrier to the MMU 328, supporting the processing of at least two coalesced memory barriers ensures that the memory barrier instruction is accepted into a coalescing window rather than being deferred, replayed, or otherwise stalled. Acceptance of the memory barrier instructions allows subsequent instructions for thread groups that have not issued a memory barrier instruction to be processed.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computer-implemented method for processing memory barrier instructions, the method comprising:

receiving a first memory barrier instruction for a first thread group that includes multiple parallel execution threads;

blocking the execution of memory transactions for the first thread group that are subsequent to the first memory barrier instruction in program order;

receiving, subsequent to the first memory barrier instruction, a first set of memory transactions and a second memory barrier instruction for at least a second thread group that includes multiple execution threads;

coalescing the first memory barrier instruction and the second memory barrier instruction to generate a coalesced memory barrier instruction;

tagging each transaction in the first set of memory transactions with a first coalescing index associated with the coalesced memory barrier instruction to generate tagged memory commands;

combining the tagged memory commands and the coalesced memory barrier instruction to generate a tagged memory command stream;

transmitting the tagged memory command stream and memory transactions for the first thread group that are prior to the first memory barrier instruction in program order to a memory management unit to process the memory transactions for the first thread group that are prior to the first memory barrier instruction in program order, the first set of memory transactions, the first memory barrier instruction, and the second memory barrier instruction;

determining that the memory transactions for the first thread group that are prior to the first memory barrier instruction in program order and the first set of memory transactions are committed to memory; and releasing both the first memory barrier instruction to allow the memory transactions for the first thread group that are subsequent to the first memory barrier instruction in program order to be executed and the second memory barrier instruction to allow the memory transactions for the second thread group that are subsequent to the second memory barrier instruction in program order to be executed.

2. The method of claim 1, further comprising, in response to receiving the first memory barrier instruction, outputting a memory barrier accept signal that includes the first coalescing index.

3. The method of claim 2, further comprising:
receiving a third memory barrier instruction for a third thread group that includes multiple parallel execution threads;
blocking the execution of memory transactions for the third thread group that are subsequent to the third memory barrier instruction in program order;
receiving, subsequent to the third memory barrier instruction, a second set of memory transactions and a fourth memory barrier instruction for at least a fourth thread group that includes multiple execution threads;
coalescing the third memory barrier instruction and the fourth memory barrier instruction to generate a second coalesced memory barrier instruction;
tagging each transaction in the second set of memory transactions with a second coalescing index associated with the second coalesced memory barrier instruction to generate second tagged memory commands;
combining the second tagged memory commands and the second coalesced memory barrier instruction to generate a second taqqed memory command stream;
transmitting the second tagged memory command stream and memory transactions for the third thread group that are prior to the third memory barrier instruction in program order to the memory management unit to process the memory transactions for the third thread group that are prior to the third memory barrier instruction in program order, the second set of memory transactions, the third memory barrier instruction, and the fourth memory barrier instruction;
determining that the memory transactions for the third thread group that are prior to the third memory barrier instruction in program order and the second set of memory transactions are committed to memory; and
releasing both the third memory barrier instruction to allow the memory transactions for the third thread group that are subsequent to the third memory barrier instruction in program order to be executed and the fourth memory barrier instruction to allow the memory transactions for the fourth thread group that are subsequent to the fourth memory barrier instruction in program order to be executed.

4. The method of claim 3, further comprising, in response to receiving the third memory barrier instruction, outputting a second memory barrier accept signal that includes the second coalescing index.

5. The method of claim 3, wherein the second tagged memory command stream and memory transactions for the third thread group that are prior to the third memory barrier instruction in program order are transmitted to the memory management unit prior to determining that the memory transactions for the first thread group that are prior to the first memory barrier instruction in program order and the first set of memory transactions are committed to memory.

6. The method of claim 1, wherein the step of determining comprises waiting for a memory barrier acknowledgement signal from the memory management unit that indicates that the memory transactions for the first thread group that are prior to the first memory barrier instruction in program order and the first set of memory transactions are committed to memory.

7. The method of claim 1, further receiving an acknowledgement from the memory management unit once the coalesced memory barrier instruction has been processed prior to releasing the first memory barrier instruction and the second memory barrier instruction.

8. A computing system, comprising:
a memory; and
a parallel processing subsystem coupled to the memory and comprising:
an instruction scheduling unit configured to:
issue for execution a first memory barrier instruction for a first thread group that includes multiple parallel execution threads;
issue for execution, subsequent to the first memory barrier instruction, a first set of memory transactions and a second memory barrier instruction for at least a second thread group that includes multiple execution threads;
block the execution of memory transactions for the first thread group that are subsequent to the first memory barrier instruction in program order;
block the execution of memory transactions for the second thread group that are subsequent to the second memory barrier instruction in program order; and
release both the first memory barrier instruction to allow execution of the memory transactions for the first thread group that are subsequent to the first memory barrier instruction in program order and the second memory barrier instruction to allow execution of the memory transactions for the second thread group that are subsequent to the second memory barrier instruction in program order when an acknowledgement signal is received;
a memory management unit configured to process memory transactions and memory barrier instructions; and
a memory barrier instruction execution unit that is configured to:
receive the first memory barrier instruction;
receive the first set of memory transactions and the second memory barrier instruction;
coalesce the first memory barrier instruction and the second memory barrier instruction to generate a coalesced memory barrier instruction;
tag each transaction in the first set of memory transactions with a first coalescing index associated with the coalesced memory barrier instruction to generate tagged memory commands; and
combine the tagged memory commands and the coalesced memory barrier instruction to generate a tagged memory command stream.

9. The computing system of claim 8, wherein the memory barrier instruction execution unit is further configured to:
transmit the tagged memory command stream and memory transactions for the first thread group that are prior to the first memory barrier instruction in program order to a memory management unit to process the memory transactions for the first thread group that are prior to the first memory barrier instruction in program order, the first set of memory transactions, the first memory barrier instruction, and the second memory barrier instruction;
determine that the memory transactions for the first thread group that are prior to the first memory barrier instruction in program order and the first set of memory transactions are committed to memory; and
transmit the acknowledgement signal to the instruction scheduling unit.

10. The computing system of claim 8, wherein the memory barrier instruction execution unit is further configured to, in response to receiving the first memory barrier instruction, output a memory barrier accept signal that includes the first coalescing index.

11. A processing subsystem comprising:
an instruction scheduling unit configured to:
issue for execution a first memory barrier instruction for a first thread group that includes multiple parallel execution threads;
issue for execution, subsequent to the first memory barrier instruction, a first set of memory transactions and a second memory barrier instruction for at least a second thread group that includes multiple execution threads;
block the execution of memory transactions for the first thread group that are subsequent to the first memory barrier instruction in program order;
block the execution of memory transactions for the second thread group that are subsequent to the second memory barrier instruction in program order; and
release both the first memory barrier instruction to allow execution of the memory transactions for the first thread group that are subsequent to the first memory barrier instruction in program order and the second memory barrier instruction to allow execution of the memory transactions for the second thread group that are subsequent to the second memory barrier instruction in program order when an acknowledgement signal is received;
a memory management unit configured to process memory transactions and memory barrier instructions; and
a memory barrier instruction execution unit that is configured to:
receive the first memory barrier instruction;
receive the first set of memory transactions and the second memory barrier instruction;
coalesce the first memory barrier instruction and the second memory barrier instruction to generate a coalesced memory barrier instruction
tag each transaction in the first set of memory transactions with a first coalescing index associated with the coalesced memory barrier instruction to generate tagged memory commands; and
combine the tagged memory commands and the coalesced memory barrier instruction to generate a tagged memory command stream.

12. The processing subsystem of claim 11, wherein the memory barrier instruction execution unit is further configured to, in response to receiving the first memory barrier instruction, output a memory barrier accept signal that includes the first coalescing index.

13. The processing subsystem of claim 12, wherein the memory barrier instruction execution unit is further configured to:
receive a third memory barrier instruction for a third thread group that includes multiple execution threads;
receive a second set of memory transactions and a second memory barrier instruction for a fourth thread group that includes multiple execution threads;
coalesce the third memory barrier instruction and the fourth second memory barrier instruction to generate a second coalesced memory barrier instruction;
tag each transaction in the second set of memory transactions with a second coalescing index associated with the second coalesced memory barrier instruction to generate second tagged memory commands; and
combine the second tagged memory commands and the second coalesced memory barrier instruction to generate a second tagged memory command stream.

14. The processing subsystem of claim 13, wherein the memory barrier instruction execution unit is further configured to, in response to receiving the third memory barrier instruction, outputting a second memory barrier accept signal that includes the second coalescing index.

15. The processing subsystem of claim 13, wherein the memory barrier instruction execution unit is further configured to transmit the second tagged memory command stream and memory transactions for the third thread group that are prior to the third memory barrier instruction in program order to the memory management unit prior to determining that the memory transactions for the first thread group that are prior to the first memory barrier instruction in program order and the first set of memory transactions are committed to memory.

16. The processing subsystem of claim 11, wherein the memory barrier instruction execution unit is further configured to:
transmit the tagged memory command stream and memory transactions for the first thread group that are prior to the first memory barrier instruction in program order to a memory management unit to process the memory transactions for the first thread group that are prior to the first memory barrier instruction in program order, the first set of memory transactions, the first memory barrier instruction, and the second memory barrier instruction;
determine that the memory transactions for the first thread group that are prior to the first memory barrier instruction in program order and the first set of memory transactions are committed to memory; and
transmit the acknowledgement signal to the instruction scheduling unit.

17. The processing subsystem of claim 11, wherein the memory barrier instruction execution unit is further configured to wait for a memory barrier acknowledgement signal from the memory management unit that indicates that the memory transactions for the first thread group that are prior to the first memory barrier instruction in program order and the first set of memory transactions are committed to memory.

18. The processing subsystem of claim 17, the memory barrier instruction execution unit is further configured to receive an acknowledgement from the memory management unit once the coalesced memory barrier instruction has been processed prior to releasing the first memory barrier instruction and the second memory barrier instruction.

* * * * *